(12) United States Patent
Touura

(10) Patent No.: US 7,508,552 B2
(45) Date of Patent: Mar. 24, 2009

(54) DOCUMENT READER, IMAGE FORMING APPARATUS, AND IMAGE PROCESSING METHOD

(75) Inventor: Kousuke Touura, Tokyo (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 963 days.

(21) Appl. No.: 10/793,267

(22) Filed: Mar. 4, 2004

(65) Prior Publication Data
US 2004/0246533 A1 Dec. 9, 2004

(30) Foreign Application Priority Data
Jun. 6, 2003 (JP) ............... 2003-162246

(51) Int. Cl.
H04N 1/04 (2006.01)
(52) U.S. Cl. .............. 358/474; 358/1.9; 358/461; 358/2.1; 382/274; 382/167; 399/49; 399/69; 345/168; 345/173
(58) Field of Classification Search ......... 358/474, 358/534, 536, 448, 461, 1.9, 470, 2.1, 426.12, 358/539, 500, 512; 382/100, 236, 274, 166–167; 399/49, 69, 81; 345/168, 173
See application file for complete search history.

(56) References Cited

U.S. PATENT DOCUMENTS

| 4,864,391 | A | * | 9/1989 | Taguchi | ........... | 358/518 |
| 4,888,636 | A | * | 12/1989 | Abe | ........... | 358/519 |
| 5,199,081 | A | * | 3/1993 | Saito et al. | ........... | 382/116 |
| 5,786,906 | A | * | 7/1998 | Shishizuka | ........... | 358/500 |
| 6,434,266 | B1 | * | 8/2002 | Kanno et al. | ........... | 382/162 |
| 6,486,981 | B1 | * | 11/2002 | Shimura et al. | ........... | 358/500 |
| 6,693,918 | B1 | * | 2/2004 | Dallabetta et al. | ........... | 370/503 |
| 6,927,877 | B2 | * | 8/2005 | Kanno et al. | ........... | 358/3.1 |
| 6,965,457 | B2 | * | 11/2005 | Nakanishi et al. | ........... | 358/2.1 |
| 7,044,364 | B2 | * | 5/2006 | Ooki | ........... | 235/375 |
| 7,085,009 | B2 | * | 8/2006 | Kawai et al. | ........... | 358/1.9 |

(Continued)

FOREIGN PATENT DOCUMENTS

JP  07-030752 A  1/1995

(Continued)

Primary Examiner—Negussie Worku
(74) Attorney, Agent, or Firm—Frishauf, Holtz, Goodman & Chick, P.C.

(57) ABSTRACT

To improve operationality in color adjustment of an image quality, colored characters, or the like of a document including one of a character image, a photographic image, and a screened halftone image of chromatic or achromatic color, the invention comprises image processing means (36) for identifying a character area, a photographic area, and a screened halftone area of a document on the basis of a first parameter and determining whether one or more of the character area, the photographic area, and the screened halftone area of the document are chromatic or achromatic on the basis of a second parameter to perform image processing according to them; operation setting means (14) for setting the first and second parameters; and control means (15) for displaying a first parameter adjustment content for use in identifying one or more of the character area, the photographic area, and the screened halftone area of the document and a second parameter adjustment content for use in determining whether one or more of the character area, the photographic area, and the screened halftone area of the document are chromatic or achromatic on the same screen.

7 Claims, 13 Drawing Sheets

U.S. PATENT DOCUMENTS

| | | | |
|---|---|---|---|
| 7,148,997 B2 * | 12/2006 | Kawai et al. | 358/1.9 |
| 7,340,092 B2 * | 3/2008 | Tanaka et al. | 382/170 |
| 2002/0176105 A1 * | 11/2002 | Kawai et al. | 358/1.9 |
| 2005/0206983 A1 * | 9/2005 | Kawai et al. | 358/532 |

FOREIGN PATENT DOCUMENTS

| | | |
|---|---|---|
| JP | 09-172544 A | 6/1997 |
| JP | 2000-134472 | 5/2000 |

* cited by examiner

DOCUMENT READER, IMAGE FORMING APPARATUS, AND IMAGE PROCESSING METHOD

BACKGROUND OF THE INVENTION

1. Field of the Invention

The present invention relates to a document reader, an image forming apparatus, and an image processing method which are preferable applied to a scanner, a color digital copying machine, or a complex machine having an image area identification and adjustment function of identifying an image area and adjusting image data.

2. Description of the Prior Arts

Recently, there has been used a color image forming apparatus for forming a color image based on image data related to red (R), green (G), and blue (B) colors obtained from a colored document image or for forming a color image based on image data received from a printer controller (an external device) such as a server or a personal computer (hereinafter, referred to simply as PC). To form an optimum color image by means of this type of color image forming apparatus, it is necessary to identify a photographic image, a screened halftone image, or a character area on the basis of image data of a document and to perform image processing based on a result of the identification before the image formation.

Japanese Unexamined Patent Publication (Kokai) No. Hei09-172544 (1997) discloses an image processing apparatus for identifying a type of a target image in FIG. 2 on page 2. According to the image processing apparatus, an identification means identifies a type of an image based on image data when identifying a type of image data obtained from a document reader (scanner). The image data is processed according to a result of the image type identified by the identification means. When executing a magnification/reduction process, the processing means modifies an identification operation of the identification means. In other words, an identification parameter of the processing means is variable according to reading conditions in the document reader. This enables a precise identification of the type of the target image according to processing conditions or reading conditions of the target image.

Japanese Unexamined Patent Publication (Kokai) No. 2000-134472 discloses a digital image forming apparatus for forming an electrostatic latent image by converting document information to electric signals before developing the electrostatic latent image in FIG. 2 on page 3. The digital image forming apparatus comprises a threshold modification means, which modifies a threshold for classifying dots in the document into a character part and an image part to a character processing side or to an image processing side when setting the threshold. In other words, the setting is made with modifying the threshold for classifying dots into an image and a character. This increases sharpness of the character part and realizes a smooth and natural copy image in the screened halftone image part, which matches the document or a user's intention.

Japanese Unexamined Patent Publication (Kokai) No. Hei07-30752 (1995) discloses an image area identifying apparatus for identifying a type of an image in FIG. 2 on page 2. The image area identifying apparatus comprises a photographic image area identification means, a screened halftone image area identification means, and a character area identification means, wherein the image area identifying apparatus finds an average density for each block from image data, finds a density difference between the average density obtained for each block and an average density of adjacent blocks, and identifies a photographic image area, a screened halftone image area, and a character area on the basis of the density difference. This enables a character image area to be discriminated from a non-character image area from a mixed image area including a character image, a photographic image, and a screened halftone image.

The conventional color image forming apparatuses, however, have the following problems when identifying a photographic image, a screened halftone image, or a character image from image data of a chromatic or achromatic document and performing image processing based on a result of the identification.

(1) In the above patent publications, an image identification parameter is often set on an operating screen easy to operate for a user. When the image identification parameter is set on the operating screen, generally the operating screen is separated into two parts: an operating screen for adjusting a character image and an operating screen for adjusting a non-character image. For example, if a thick gray character with a tinge of some color need be output sharply in solid black, the operating screen separated into two parts requires an operation with visiting the character image adjustment setting screen and the non-character image adjustment setting screen alternately.

(2) As stated above, unless the image identification parameter is appropriate according to the document, it is necessary to repeat color adjustment while opening two adjustment setting screens and visiting the screens alternately. Furthermore, inconveniently a user cannot be informed of their adjustment amounts at a time. Therefore, there is the possibility that it becomes hard to predict an output after color adjustment or that it takes a lot of time for color adjustment, thereby deteriorating the operationality at the color adjustment.

SUMMARY OF THE INVENTION

The present invention has been provided to resolve these problems of the conventional technologies. Therefore, it is an object of the present invention to provide a document reader, an image forming apparatus, and an image processing method for improving the operationality in color adjustment of an image quality, colored characters, or the like of a document including a character image, a photographic image, and a screened halftone image of chromatic or achromatic color.

To achieve the above object, according to one aspect of the present invention, there is provided a document reader for reading a chromatic or achromatic document with document reading means, comprising: first identification means for inputting image information obtained from the document reading means and identifying image areas on the basis of a first identification reference value from characteristics of the image information; second identification means for determining whether the image areas are chromatic or achromatic on the basis of a second identification reference value; image processing means for performing processing for each of the image areas according to the first identification means and the second identification means; and display means for displaying the first and second identification reference values, wherein the first and second identification reference values are displayed on the same screen of the display means.

According to the document reader of the present invention, the document reading means reads image information from the document when performing image processing by reading the document including one of a character image, a photographic image, and a screened halftone image of chromatic or achromatic color. The image processing means receives an input of the image information obtained from the document reading means. In addition, an operation setting means is operated so as to set the first and second identification reference vales in the image processing means. A control means controls inputs and outputs to or from the image processing means on the basis of contents set by the operation setting means. The image processing means identifies image areas of the document and performs image processing according to the chromatic or achromatic character image, photographic image, and screened halftone image of the document.

With acceptance on this point, the control means controls, for example, the display means to display the first identification reference value adjustment content for use in identifying one or more of the character area, the photographic area, and the screened halftone area of the document and the second identification reference value adjustment content for use in determining whether one or more of the character area, the photographic area, and the screened halftone area of the document are chromatic or achromatic on the same screen. The image processing means performs processing in such a way that the character area, the photographic area, and the screened halftone area of the document are identified based on the first identification reference value set by the operation setting means and that one or more of the character area, the photographic area, and the screened halftone area of the document are determined to be chromatic or achromatic based on the second identification reference value set by the operation setting means.

Therefore, an operator can set the second identification reference value adjustment content while visually checking the first identification reference value adjustment content on the same screen. This improves operationality in color adjustment of an image quality, colored characters, or the like of the document. Furthermore, it prevents a character area from being incorrectly identified as a photographic area and prevents incorrect image processing such as blurring an edge of a thick character. In addition, it prevents an achromatic character from being identified as a chromatic character and prevents incorrect image processing such as coloring a black character.

Furthermore, since the first and second identification reference value adjustment contents are displayed on the same screen, the operator can see the adjustment amounts of the image quality or the colored character that can be set according to these adjustment contents at a time and can easily predict the adjusted image formation output. Furthermore, this enables the operator to handle both adjustment items on the same screen at a time, to adjust the image quality, the colored characters, or the like quickly, and to understand easily where the adjustment items are displayed.

According to another aspect of the present invention, there is provided an image forming apparatus for outputting an image read with document reading means for reading a chromatic or achromatic document, comprising: first identification means for inputting image information obtained from the document reading means and identifying image areas on the basis of a first identification reference value from characteristics of the image information; second identification means for determining whether the image areas are chromatic or achromatic on the basis of a second identification reference value; image processing means for performing processing for each of the image areas according to the first identification means and the second identification means; display means for displaying the first and second identification reference values; and image formation means for forming an image on the basis of the image information processed by the image processing means, wherein the first and second identification reference values are displayed on the same screen of the display means.

According to the image forming apparatus of the present invention, the image processing means receives, for example, an input of the image information obtained from the document reading means of the present invention for forming a chromatic or achromatic image including one of a character image, a photographic image, and a screened halftone image. In addition, an operation setting means is operated so as to set the first and second identification reference vales in the image processing means. A control means controls inputs and outputs to or from the image processing means on the basis of the contents set by the operation setting means. The image processing means identifies image areas of the document and performs image processing according to the chromatic or achromatic character image, photographic image, and screened halftone image of the document.

With acceptance on this point, the control means controls, for example, the display means to display the first identification reference value adjustment content for use in identifying one or more of the character area, the photographic area, and the screened halftone area of the document and the second identification reference value adjustment content for use in determining whether one or more of the character area, the photographic area, and the screened halftone area of the document are chromatic or achromatic on the same screen. The image processing means performs processing in such a way that the character area, the photographic area, and the screened halftone area of the document are identified based on the first identification reference value set by the operation setting means and that one or more of the character area, the photographic area, and the screened halftone area of the document are determined to be chromatic or achromatic based on the second identification reference value set by the operation setting means.

Therefore, an operator can set the second identification reference value adjustment content while visually checking the first identification reference value adjustment content on the same screen. This improves operationality in color adjustment of an image quality, colored characters, or the like of the document. Furthermore, it prevents a character area from being incorrectly identified as a photographic area and prevents incorrect image processing such as blurring an edge of a thick character. In addition, it prevents an achromatic character from being incorrectly identified as a chromatic character and prevents incorrect image processing such as coloring a black character.

According to still another aspect of the present invention, there is provided an image processing method of inputting image information on a chromatic or achromatic document, identifying areas of the document on the basis of characteristics of the image information, and performing image processing, comprising: a first identification step of identifying image areas on the basis of a first identification reference value from the characteristics of the image information; a second identification step of determining whether the image areas are chromatic or achromatic on the basis of a second identification reference value; an image processing step of performing processing for each of the image areas according to the first identification step and the second identification step; and a display step of displaying the first and second identification reference values, wherein the first and second identification reference values are displayed on the same screen in the display step.

According to the image forming method of the present invention, an operator can set the second identification reference value adjustment content while visually checking the first identification reference value adjustment content on the same screen. This improves operationality in color adjustment of an image quality, colored characters, or the like of the document. Furthermore, it prevents a character area from being incorrectly identified as a photographic area and prevents incorrect image processing such as blurring an edge of a thick character. In addition, it prevents an achromatic character from being incorrectly identified as a chromatic character and prevents incorrect image processing such as coloring a black character.

DETAILED DESCRIPTION OF THE PREFERRED EMBODIMENTS

The preferred embodiments of a document reader, an image forming apparatus, and an image processing method according to the present invention will now be described in detail hereinafter with reference to the accompanying drawings.

(1) Document Reader

Figure 1:
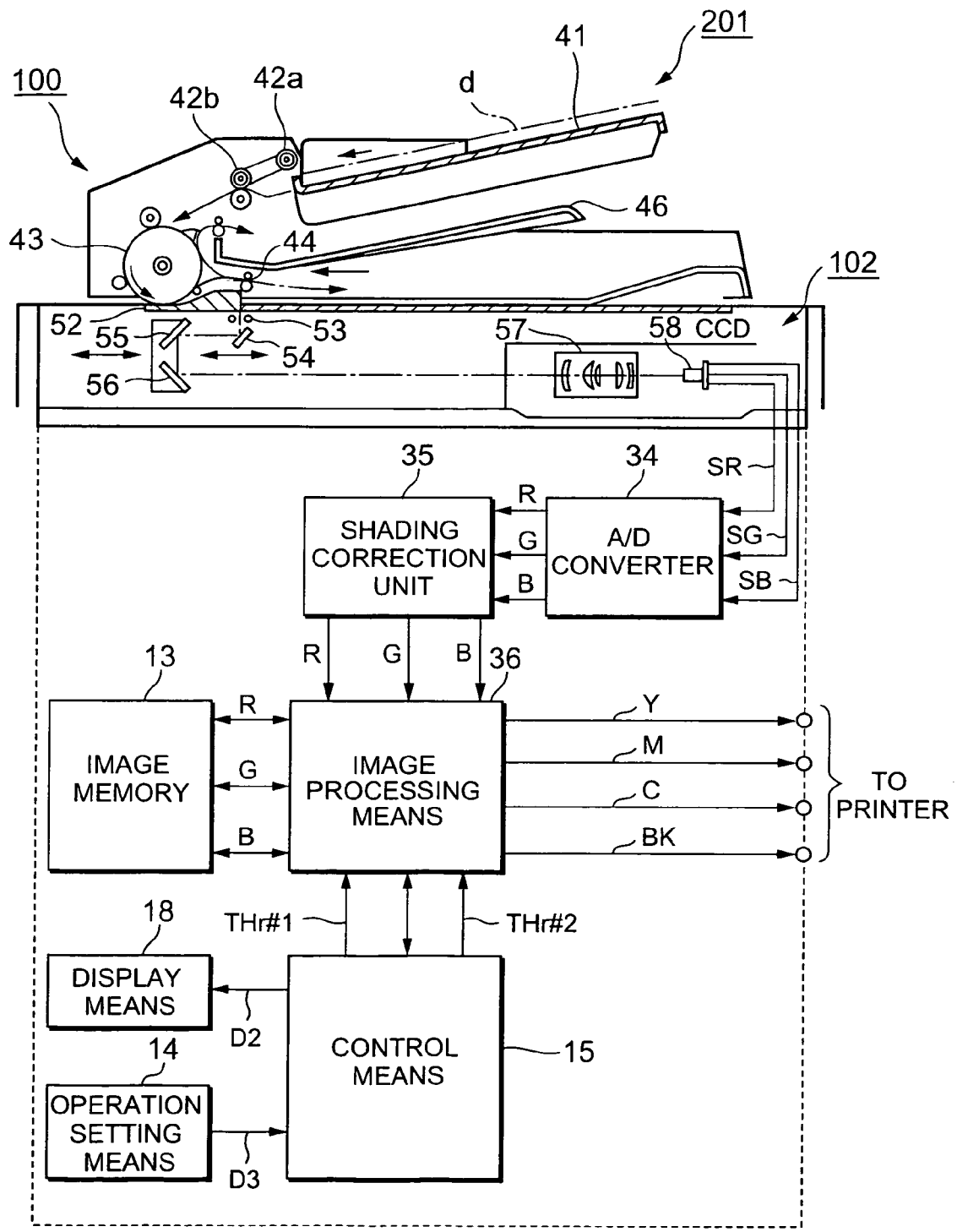
FIG. 1 is a conceptual diagram showing an illustrative configuration of a color scanner 100 to which a document reader is applied as an embodiment of the present invention.

Referring to FIG. 1, there is shown a conceptual diagram showing an illustrative configuration of a color scanner 100 to which a document reader is applied as an embodiment of the present invention.

For processing an image by reading a document including a character image, a photographic image, and a screened halftone image of chromatic or achromatic color, this embodiment comprises control means for displaying a first identification reference value adjustment content for use in identifying one or more of a character area, a photographic area, and a screened halftone area of the document and a second identification reference value adjustment content for use in determining whether one or more of the character area, the photographic area, and the screened halftone area of the document is chromatic or achromatic on the same screen, by which an operator can set the second identification reference value adjustment content while visually checking the first identification reference value adjustment content on the same screen and by which operationality is improved in color adjustment of an image quality, colored characters, or the like.

The color scanner 100 shown in FIG. 1 is an example of the document reader, which reads image information on a document d including a character image, a photographic image, and a screened halftone image of chromatic or achromatic color and outputs digital image formation data Y, M, C, and K. The scanner 100 has a document reading unit 102 as an example of a document reading means, which reads image information from the document d and outputs analog image signals SR, SG, and SB.

At the top of a body of the scanner, there is attached, for example, an automatic document feeder (ADF) 201. The ADF 201 comprises a document mounting unit 41, a roller 42a, a roller 42b, a roller 43, a converting roller 44, a converting unit 45, and a discharge tray 46. The document reading unit 102 has a first platen glass 51, a second platen glass 52, a light source 53, mirrors 54, 55, and 56, a focusing optical unit 57, a CCD imaging device 58, and an optical drive unit, which is not shown.

The CCD imaging device 58 is connected at an output stage to an analog-digital (hereinafter, referred to as A/D) converter 34, where analog image signals SR, SG, and SB are A/D-converted and image data R, G, and B for digital R, G, and B colors are output. The A/D converter 34 is connected to a shading correction unit 35, where the image data R, G, and B are corrected by shading correction.

The shading correction unit 35 is connected to an image processing means 36, which identifies one or more of the character area, the photographic area, and the screened halftone area of the document d on the basis of a first identification reference value Thr#1 upon receiving an input of the image data R, G, and B for the R, G, and B colors obtained from the document reading unit 102 and determines whether one or more of the character area, the photographic area, and the screened halftone area of the document d are chromatic or achromatic on the basis of a second identification reference value Thr#2 so as to perform image processing according to the chromatic or achromatic character image, photographic image, and screened halftone image of the document d.

Needless to say, the image processing means 36 performs filtering processing for the image data R, G, and B and gamma control for the image data R, G, and B after the filtering processing. The image data R, G, and B after the gamma control are converted in color to image formation data Y, M, C, and K for the Y, C, M, and K colors. Thereafter, the color-converted image formation data Y, M, C, and K go through error diffusion processing (See FIG. 2).

The image processing means 36 is connected to an image memory 13 and a control means 15. The image memory 13 temporarily stores the image data R, G, and B. The control means 15 is connected to an operation setting means 14, so that parameters can be adjusted independently. The operation setting means 14 is operated so as to set an identification reference value (hereinafter, referred to as a parameter) Thr#1 and a parameter Thr#2 in the image processing means 36.

In this embodiment, a user can make instructions freely on the parameters. For example, the operation setting means 14 is operated so as to output operation data D3 for use in adjusting an image quality or colored characters of the document d to the control means 15. The control means 15 adjusts the image quality of the document d by setting the parameter Thr#1 to the image processing means 36 on the basis of the operation data D3 input from the operation setting means 14 and adjusts the colored characters of the document d by setting the parameter Thr#2 likewise.

The control means 15 is connected to display means 18, where the first and second parameter adjustment contents are displayed on the same screen. The first parameter adjustment content means an adjusted content of the parameter Thr#1 for use in determining one or more of the character area, the photographic area, and the screened halftone area of the document d. The second parameter adjustment content means an adjusted content of the parameter Thr#2 for use in determining whether one or more of the character area, the photographic area, and the screened halftone area of the document d are chromatic or achromatic.

The control means 15 controls inputs and outputs to or from the image processing means 36 on the basis of a content set by the operation setting means 14. For example, the control means 15 outputs display data D2 for use in displaying the first parameter adjustment content and the second parameter adjustment content to the display means 18 and controls the display means 18 to display the parameter adjustment contents on the same screen on the basis of the display data D2.

Figure 2:
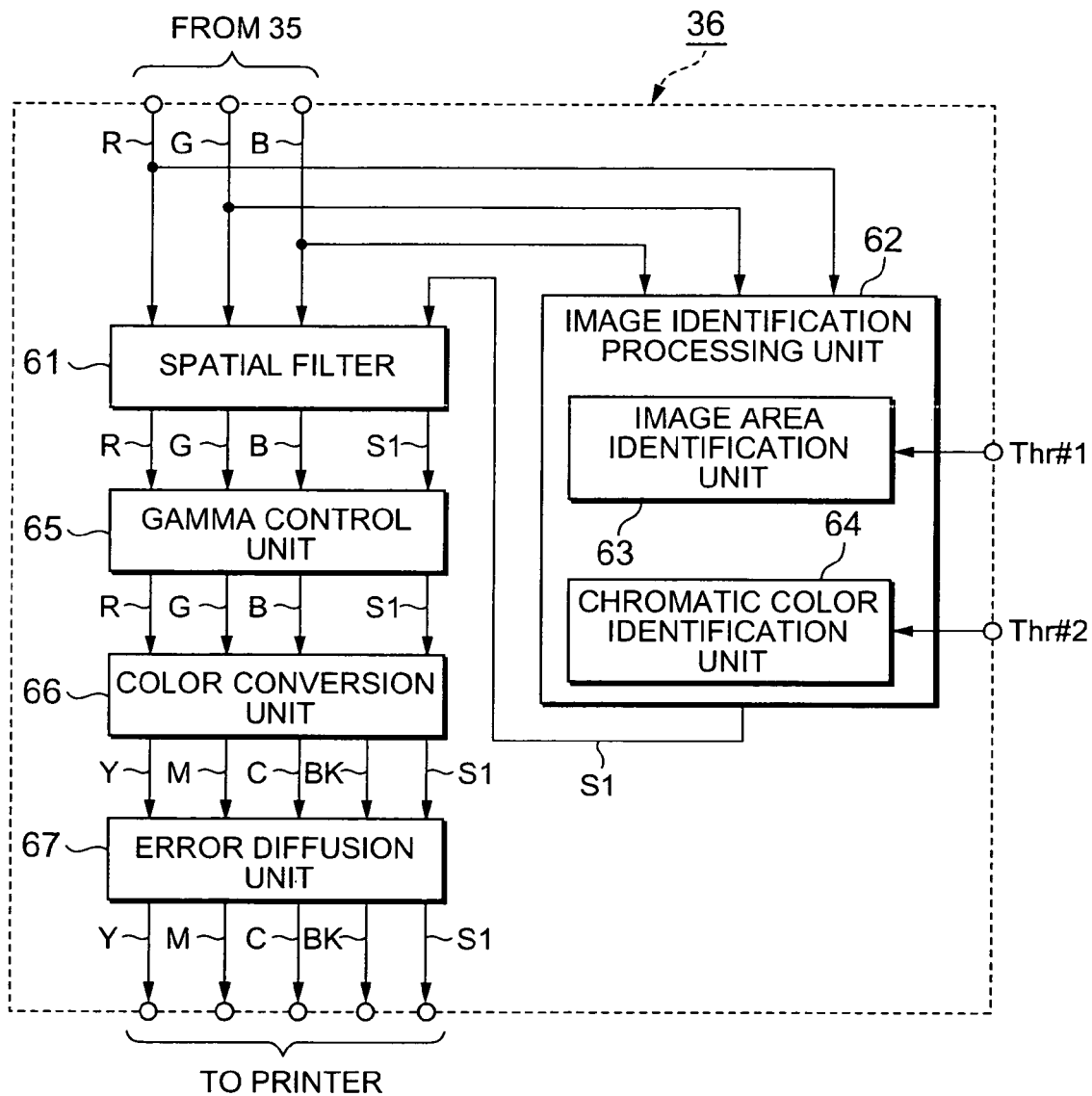
FIG. 2 is a block diagram showing an illustrative internal configuration of image processing means 36.

Referring to FIG. 2, there is shown a block diagram of an illustrative internal configuration of the image processing means 36. The image processing means 36 in FIG. 2 comprises a spatial filter 61, an image identification processing unit 62, a gamma control unit 65, a color conversion unit 66, and an error diffusion unit 67. The image identification processing unit 62 has an image area identification unit 63 and a chromatic color identification unit 64. The image area identification unit 63 receives an input of the image data (image information) R, G, and B for R, G, and B colors obtained from the document reading unit 102 and identifies the character area, the photographic area, or the screened halftone area of the document d on the basis of the first parameter Thr#1 (For information about the flowchart, see FIG. 5).

The chromatic color identification unit 64 determines whether one or more of the character area, the photographic area, and the screened halftone area of the document d are chromatic or achromatic on the basis of the second parameter Thr#2. For example, the chromatic color identification unit makes calculations described below. Supposing here that R, G, and B are image data; W is a variable (luminance) under calculation; a, b, and c are calculation parameters; C is a result of identification; and Thr#2 is an identification reference value, the identification result C is obtained by the following formulas (1) and (2):

$$W=(R+G+B)/3 \quad (1)$$

$$C=a|R-W|+b\times|G-W|+c\times|B-W| \quad (2)$$

If C>Thr#2 as a result of the calculation with the above formulas, the chromatic color identification unit 64 determines that one or more of the character area, the photographic area, and the screened halftone area of the document d are chromatic. If C<Thr#2, it determines that one or more of the character area, the photographic area, and the screened halftone area of the document d are achromatic (For information about the circuit configuration, see FIG. 3).

The image identification processing unit 62 determines whether the character area, the photographic area, or the screened halftone area of the document d is chromatic or achromatic. For example, a 4-bit image identification signal S1 is output to the spatial filter 61, the image identification processing unit 62, the gamma control unit 65, the color conversion unit 66, and the error diffusion unit 67. The spatial filter 61 reads out image data R, G, and B from the image memory 13 and filters the image identification signal S1 input from the image identification processing unit 62. For example, the spatial filter 61 expands the image data R, G, and B and performs edge enhancement for the character area of the document d, smoothing processing for the photographic area thereof, and moire removal for the screened halftone area thereof.

The gamma control unit 65 performs gamma adjustment of the image identification signal S1 and the filtered image data R, G, and B upon receiving inputs thereof. For example, the gamma control unit 65 increases the contrast for the character area of the document d and increases the gradations for the photographic and screened halftone areas. The color conversion unit 66 performs a color conversion of the image identification signal S1 and the gamma-controlled image data R, G, and B upon receiving inputs thereof. For example, the color conversion unit 66 converts the image data R, G, and B to printer color materials, Y, M, and C signals for the chromatic areas of the document d. It converts the image data R, G, and B to achromatic BK signals for the achromatic areas of the document d.

The error diffusion unit 67 performs error diffusion processing of the image identification signal S1 and the color-converted image formation data Y, M, C, and BK upon receiving inputs thereof. For example, the error diffusion unit 67 performs lower-bit error diffusion processing for the character area of the document d and higher-bit error diffusion processing for the photographic and screened halftone areas of the document d. The error-diffused image formation data Y, M, C, and BK are output to an external device such as, for example, a printer. Naturally they can be temporarily stored in the image memory 13 in the scanner 100. Furthermore, while a screen-processing circuit can be connected to an output stage of the error diffusion unit 67, the screen-processing circuit is omitted here since an incorporation of a color image forming apparatus will be described later.

Figure 3:
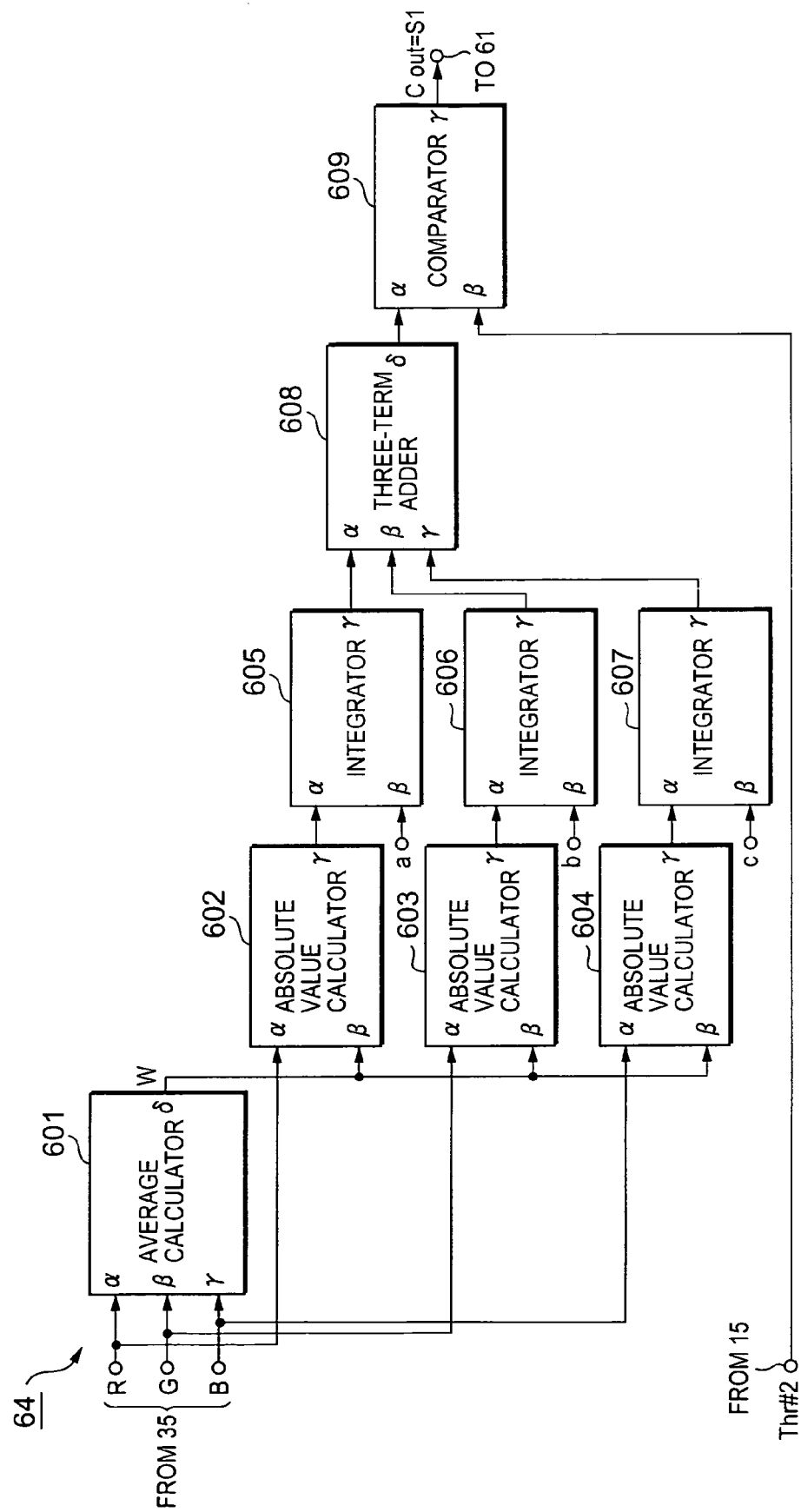
FIG. 3 is a block diagram showing an illustrative internal configuration of a chromatic color identification unit 64.

Referring to FIG. 3, there is shown a block diagram of an illustrative internal configuration of the chromatic color identification unit 64. The chromatic color identification unit 64 in FIG. 3 comprises an average calculator 601, an R-color absolute value calculator 602, a G-color absolute value calculator 603, a B-color absolute value calculator 604, an R-color integrator (multiplier) 605, a G-color integrator 606, a B-color integrator 607, a three-term adder 608, and a comparator 608.

The average calculator 601 computes an average value W on the basis of the formula (1) upon receiving an input of the image data R, G, and B. The average calculator 601 is connected to the R-, G-, and B-color absolute value calculators 602 to 604. The absolute value calculator 602 computes |R−W| in the formula (2) upon receiving inputs of the image data R and the average value W. The absolute value calculator 603 computes |G−W| upon receiving inputs of the image data G and the average value W. The absolute value calculator 604 computes |B−W| upon receiving inputs of the image data B and the average value W.

The absolute value calculator 602 is connected to the R-color integrator 605 computes a×|R−W| in the formula (2) upon receiving inputs of the absolute value |R−W| and a calculation parameter a. The absolute value calculator 603 is connected to the G-color integrator 606. The integrator 606 computes b×|G−W| in the formula (2) upon receiving inputs of the absolute value |G−W| and a calculation parameter b. The absolute value calculator 604 is connected to the G-color integrator 607. The integrator 607 computes c×|B−W| in the formula (2) upon receiving inputs of the absolute value |B−W| and a calculation parameter c.

The R-, G-, and B-integrators 605 to 607 are connected to the three-term adder 608. The three-term adder 608 adds up a×|R−W|, b×|G−W|, and c×|B−W|. The three-term adder 608 is connected to the comparator 609 to compare a×|R−W|+b× |G−W|+c×|B−W| with the parameter (threshold) Thr#2 in the formula (2) upon receiving inputs of them. If C>Thr#2 in the comparator 609, it is determined that one or more of the character area, the photographic area, and the screened halftone area of the document d are chromatic. If C<Thr#2, it is determined that one or more of the character area, the photographic area, and the screened halftone area of the document d are achromatic. This enables the chromatic color identification unit 64 to separate a chromatic area from an achromatic area of the document d. The chromatic color identification unit 64 outputs a 4-bit image identification signal $C_{out}$+S1 to the spatial filter 31 or the like.

Figure 4:
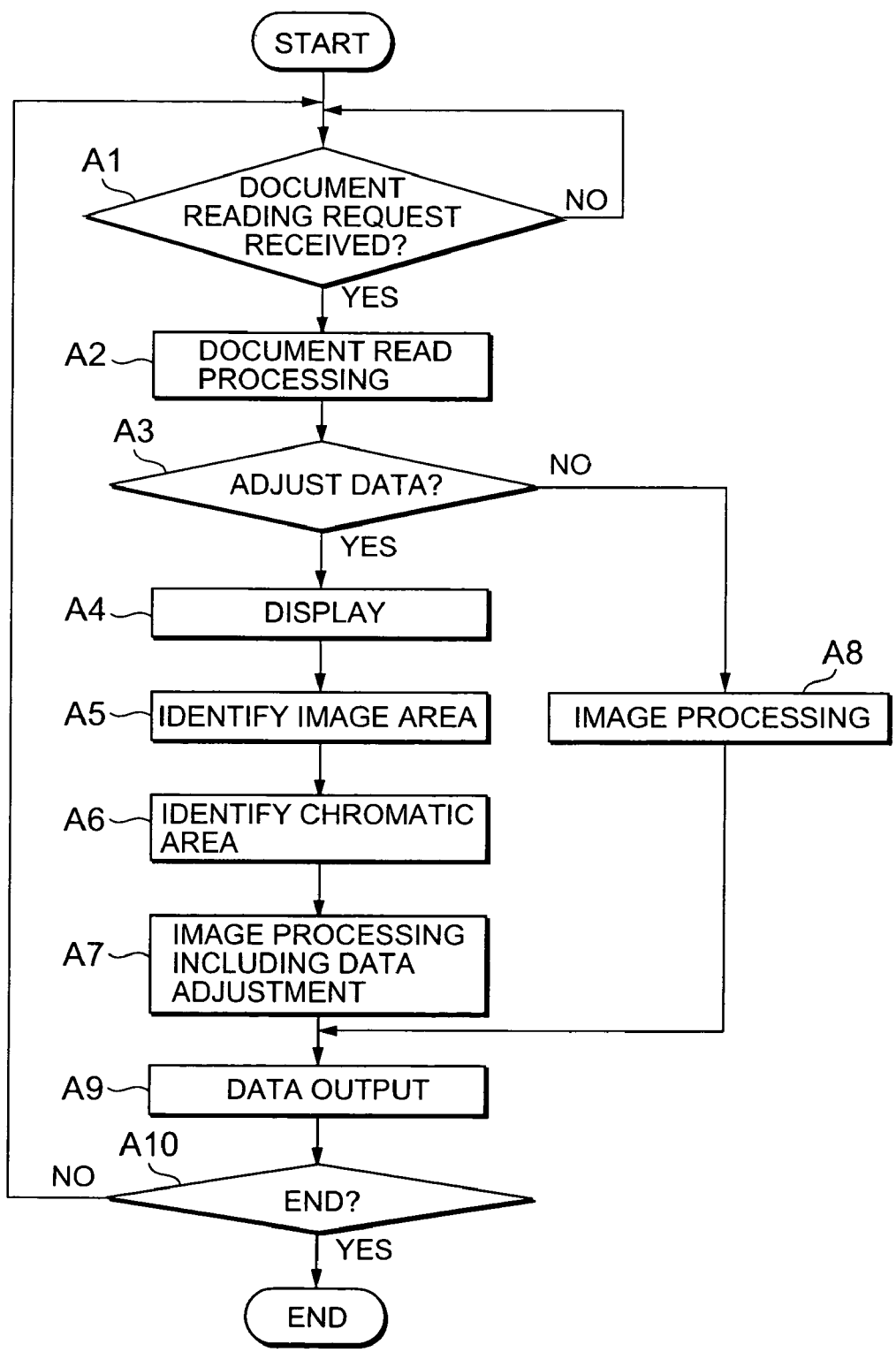
FIG. 4 is a flowchart showing an illustrative operation of the scanner 100.
Figure 5:
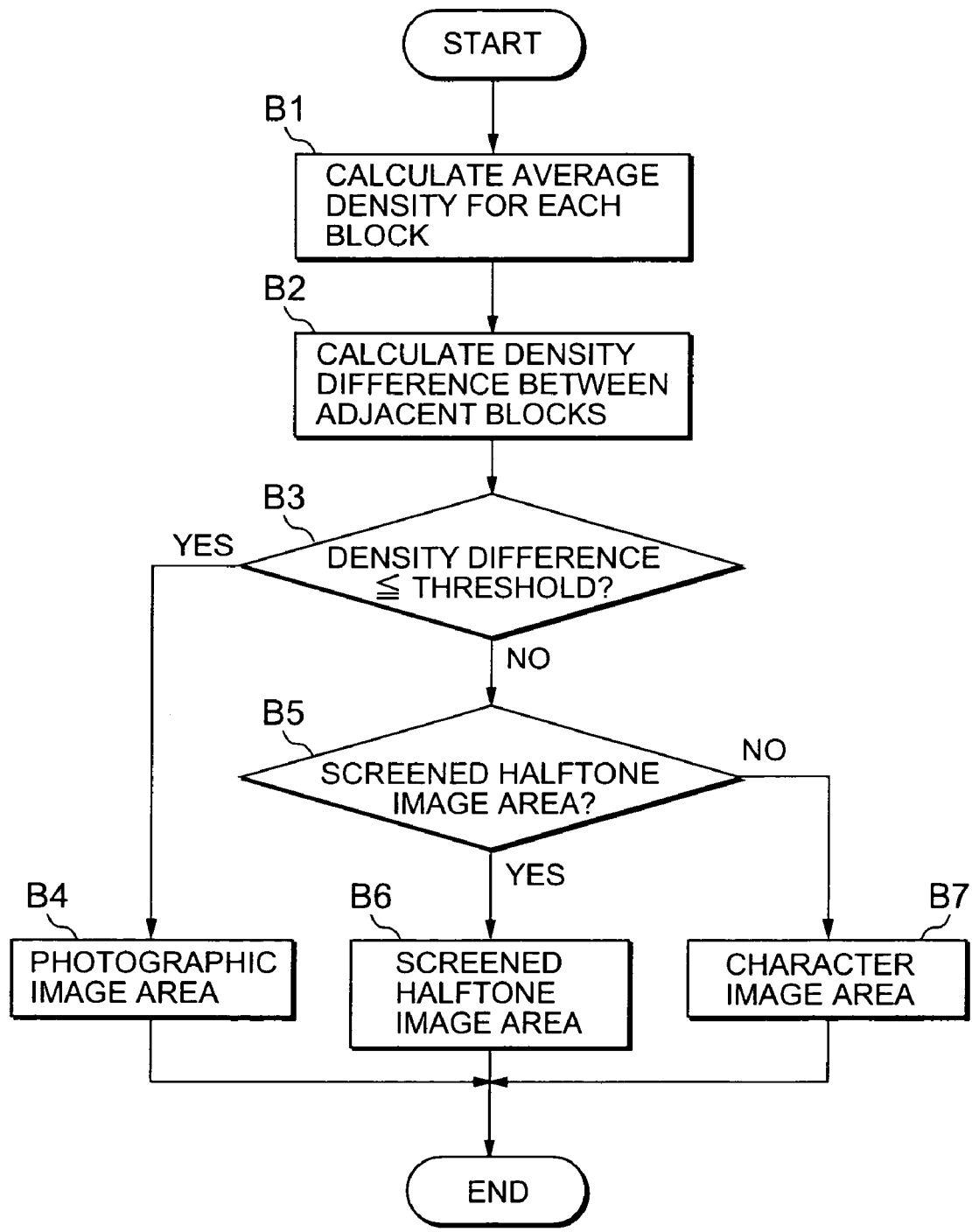
FIG. 5 is a flowchart showing an illustrative image area identification in an image area identification unit 63.

Subsequently, an image processing method of the present invention will be described by using an example of the operation of the color scanner 100. Referring to FIG. 4, there is shown a flowchart of an illustrative operation of the scanner 100. Referring to FIG. 5, there is shown a flowchart of an illustrative image area identification in the image area identification unit 63.

This embodiment is based on the assumption that image information is processed regarding the document d including the character image, the photographic image, and the screened halftone image of chromatic or achromatic color. It is described below by giving an example of image processing based on a selection of whether or not to adjust the image data R, G, and B.

With these operating conditions, a document reading request is awaited in step A1 of the flowchart shown in FIG. 4. If a document reading request is received, the control progresses to step A2. The scanner executes document read processing in step A2. For example, a document d is placed on an automatic document feeder (ADF) 201 mounted on the top of the body of the scanner, and then a start button not shown is depressed. The document reading unit 102 reads image information from the document d and outputs analog image signals SR, SG, and SB to the A/D converter 34 upon the depression of the start button.

The A/D converter 34 converts the analog image signals SR, SG, and SB to digital image signals and outputs digital R-, G-, and B-color image data R, G, and B. The shading correction unit 35 performs shading correction of the A/D-converted image data R, G, and B. The shading-corrected image data R, G, and B are stored once in the image memory 13.

Subsequently, the operation setting means 14 is operated so as to select whether to adjust the image data R, G, and B in step A3. If adjustment of the image data R, G, and B is selected here, the control progresses to step A4 to display a first parameter adjustment content for use in identifying one or more of the character area, the photographic area, and the screened halftone area of the document d and a second parameter adjustment content for use in determining whether one or more of the character area, the photographic area, and the screened halftone area of the document d are chromatic or achromatic on the same screen.

In this condition, an operator can set the second parameter adjustment content while visually checking the first parameter adjustment content on the same screen. To adjust the image data R, G, and B here, the operation setting means 14 is operated so as to set the first and second parameters Thr#1 and Thr#2 in the image processing means 36. The control means 15 controls inputs and outputs of the image processing means 36 on the basis of the contents set by the operation setting means 14.

In step A5, the image identification processing unit 62 identifies the image area. In this embodiment, the image area identification unit 63 identifies the character area, the photographic area, and the screened halftone area of the document d on the basis of the first parameter Thr#1. For example, the image area identification unit 63 calls a subroutine shown in FIG. 5, expands the image area of the document d to a plurality of blocks upon receiving an input of the R-, G, and B-color image data R, G, and B obtained from the document reading unit 102 in step B1 of the flowchart, and calculates an average density for each of the blocks.

In step B2, the image area identification unit 63 calculates a density difference between adjacent blocks in the image area of the document d. Thereafter, in step B3 the density difference between the adjacent blocks is compared with the parameter (threshold) Thr#1. If the density difference is lower than or equal to the parameter Thr#1, the control progresses to step B4 to determine that the image area of the document d is a photographic image area.

If the density difference exceeds the parameter Thr#1 in step B3, the control progresses to step B5 to determine whether the image area is a screened halftone image area. As a reference to a method of determining whether the image area is a screened halftone image area, there is Japanese Unexamined Patent Publication (Kokai) No. Hei07-30752 (1995), which is a patent document described above. If it is determined by the method that the image area is a screened halftone image area, the control progresses to step B6 to determine that the image area is a screened halftone image area. Unless the image area is a screened halftone image area, the control progresses to step B7 to determine that the image area is a character image area. This enables the image area identification unit 63 to separate the character, photographic, and screened halftone areas of the document d from each other.

In addition to the above, the image identification processing unit 62 identifies a chromatic area in step A6. In this embodiment, the chromatic color identification unit 64 determines whether one or more of the character area, the photographic area, and the screened halftone area of the document d are chromatic or achromatic on the basis of the second parameter (threshold) Thr#2. For example, the chromatic color identification unit 64 calculates formulas as shown in the above (1) and (2). If C>Thr#2 in the formulas, the chromatic color identification unit 64 determines that one or more of the character area, the photographic area, and the screened halftone area of the document d are chromatic. If C<Thr#2, it determines that one or more of the character area, the photographic area, and the screened halftone area of the document d are achromatic.

When performing image processing according to the chromatic or achromatic character image, photographic image, and screened halftone image of the document d as stated above, the scanner 100 executes image processing including data adjustment in step A7. In this condition, the image processing means 36 performs image processing according to the chromatic or achromatic character image, photographic image, and screened halftone image of the document d on the basis of a parameter adjustment value. For example, the image processing means 36 expands the image data R, G, and B and performs edge enhancement for the character area of the document d based on the parameter adjustment value, smoothing processing for the photographic area of the document d, and moire removal for the screened halftone area thereof.

The gamma control unit 65 increases the contrast for the character area of the document d on the basis of the parameter adjustment value and increases the gradations for the photographic and screened halftone areas. Furthermore, the color conversion unit 66 converts the image data R, G, and B to printer color materials, Y, M, C, and BK signals for the chromatic areas of the document d. It converts the image data R, G, and B to achromatic BK signals for the achromatic areas of the document d.

For example, supposing that R, G, and B are image data signal values; a, b, and c are calculation parameters; and BK is an achromatic signal, the value is obtained by the following formula (3):

$$BK = a \times R + b \times G + c \times B \qquad (3)$$

The calculation parameters satisfy, for example, (a, b, c)= (0.3, 0.6, 0.1).

Upon receiving inputs of the color-converted image formation data Y, M, C, and BK, the error diffusion unit 67 performs lower-bit error diffusion processing for the character area of the document d and higher-bit error diffusion processing for the photographic and screened halftone areas of the document d. Thereafter, the control progresses to step A9.

Unless the image data R, G, and B are adjusted in step A3, the control progresses to step A8 to execute image processing not including data adjustment. For example, the image processing means 36 filters the image data R, G, and B on the basis of a default value and performs gamma control of the filtered image data R, G, and B. The image data R, G, and B after the gamma control are color-converted to image formation data Y, M, C, and BK for Y, C, M, and K colors.

As a reference to a method of color-converting image data R, G, and B to image formation data Y, M, C, and BK, there are Japanese Unexamined Patent Publication (Kokai) No. 2002-152531 and Japanese Unexamined Patent Publication (Kokai) No. Hei5-153383 (1993). The image formation data Y, M, C, and BK color-converted by the method go through the error diffusion processing or the like. Thereafter, the control progresses to step A9. In step A9, the image formation data Y, M, C, and BK are output to an external device or the like.

According to the color scanner to which a document reader is applied as an embodiment of the present invention and the image processing method therefor, when image processing is performed by reading the document d including one of the character image, the photographic image, and the screened halftone image of chromatic or achromatic color, the control means 15 controls the display means 18 to display the first parameter adjustment content for use in identifying one or more of the character area, the photographic area, and the screened halftone area of the document d and the second parameter adjustment content for use in determining whether one or more of the character area, the photographic area, and the screened halftone area of the document d are chromatic or achromatic on the same screen.

Therefore, an operator can set the second parameter adjustment content while visually checking the first parameter adjustment content on the same screen. This improves operationality in color adjustment of the image quality, colored characters, and the like of the document d. Furthermore, it prevents a character area from being incorrectly identified as a photographic area and prevents incorrect image processing such as blurring an edge of a thick character. In addition, it prevents an achromatic character from being identified as a chromatic character and prevents incorrect image processing such as coloring a black character.

Furthermore, since the first and second parameter adjustment contents are displayed on the same screen, the operator can see the adjustment amounts of the image quality, colored characters, or the like that can be set according to these adjustment contents at a time and can easily predict the adjusted image formation output. Furthermore, this enables the operator to handle both adjustment items on the same screen at a time, to adjust quickly the image quality, the colored characters, or the like, and to understand easily where the adjustment items are displayed.

(2) Image Forming Apparatus

Figure 6:
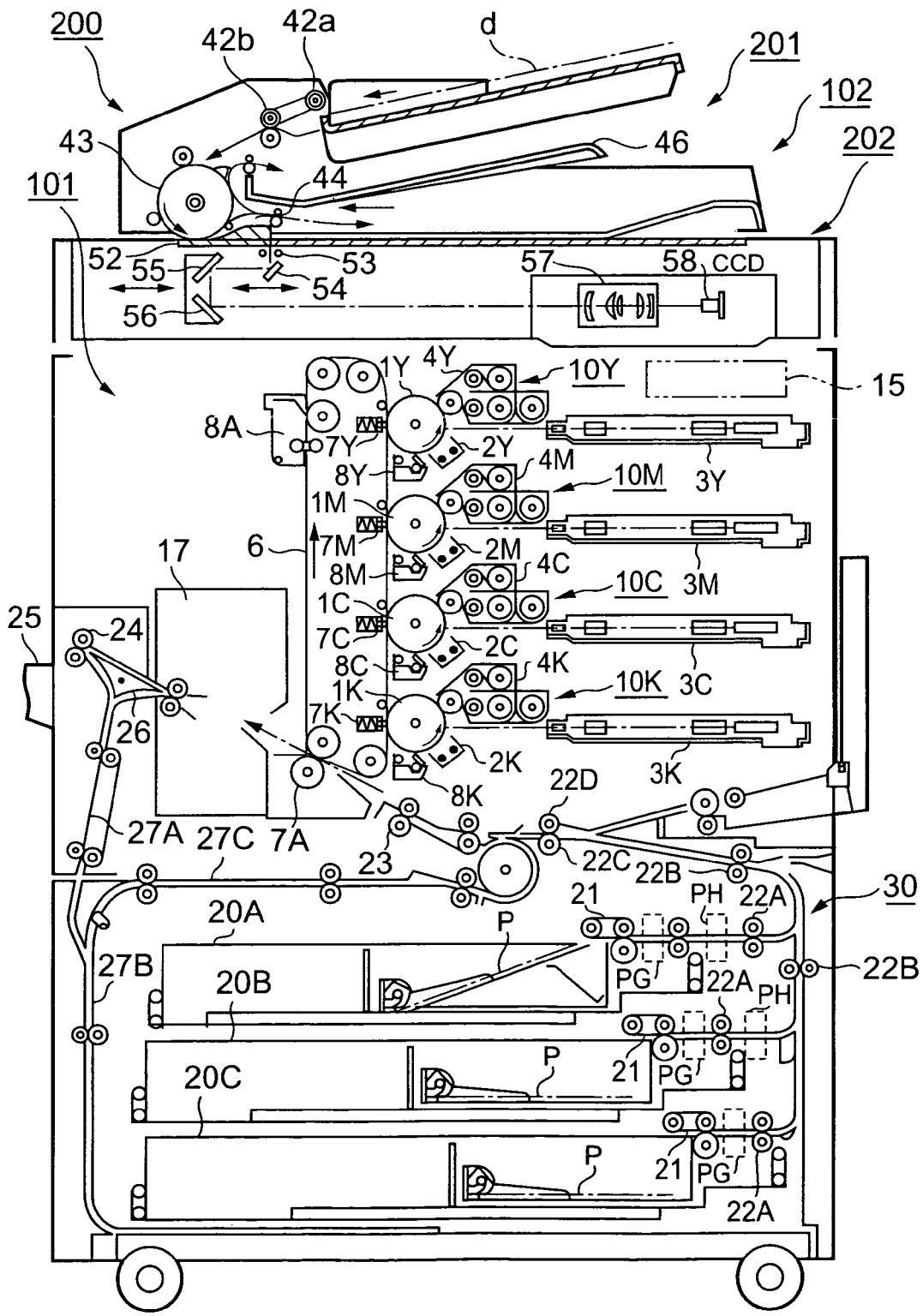
FIG. 6 is a conceptual diagram showing an illustrative configuration of a color image forming apparatus 200 as an embodiment of the present invention.

Referring to FIG. 6, there is shown a conceptual diagram of an illustrative configuration of a cross section of a color image forming apparatus 200 as an embodiment of the present invention.

In this embodiment, the color image forming apparatus 200 with the previously described color scanner feature mounted thereon has control means 15 for displaying a first parameter adjustment content for use in identifying one or more of a character area, a photographic area, and a screened halftone area of a document including a character image, a photographic image, and a screened halftone image of chromatic or achromatic color and a second parameter adjustment content for use in determining whether one or more of the character area, the photographic area, and the screened halftone area of the document are chromatic or achromatic on the same screen, if an image is formed by reading the document, so that an operator can set the second parameter adjustment content while visually checking the first parameter adjustment content on the same screen and so as to achieve improved operationality in color adjustment of the image quality, colored characters, and the like.

The color image forming apparatus 200 in FIG. 6 reads image information on the document d including the character image, the photographic image, and the screened halftone image of chromatic or achromatic color, adds colors on the basis of image formation data Y, M, C, and BK after image processing, and forms a color image on desired paper P.

The color image forming apparatus 200 comprises an image forming apparatus body 101 and an image reading unit 102. At the top of the image forming apparatus body 101, there is attached a document reading unit 102 including an automatic document feeder (ADF) 201 and a document image scanning exposure device 202. The ADF 201 comprises a document mounting unit 41, a roller 42a, a roller 42b, a roller 43, a converting roller 44, a converting unit 45, and a discharge tray 46. The document reading unit 102 has a first platen glass 51, a second platen glass 52, a light source 53, mirrors 54, 55, and 56, a focusing optical unit 57, a CCD imaging device 58, and an optical drive unit, which is not shown.

The document d placed on the document mounting unit is conveyed by conveying means. An optical system of the document image scanning exposure device 202 makes a scanning exposure on an image surface of the document d and the CCD imaging device 58 outputs image signals obtained by reading image information from the document d. For the image signals photoelectrically transferred by the CCD imaging device 58, image processing means not shown performs analog processing, A/D conversion, shading correction, image compression processing, and the like, thereby causing the image signals to be digital image data R, G, and B. Thereafter, the image data R, G, and B go through predetermined image processing. The image formation data Y, M, C, and BK after the image processing are sent to an image writing unit (exposure means) 3Y, 3M, 3C, and 3K as an example of the image formation means.

The ADF 201 has an automatic double-sided document conveying means. The ADF 201 continuously reads a large number of sheets of document d fed from the document mounting unit at a time and stores the contents of the document in an image memory or the like (electronic RDH function). The electronic RDH function is convenient for copying a large number of sheets of document by using a copying function or for transmitting a large number of sheets of document d by using a facsimile function.

The image forming apparatus body 101, which is referred to as a tandem color image forming apparatus, comprises a plurality of image forming units 10Y, 10M, 10C, and 10K forming the image formation means, an endless intermediate transfer belt 6, paper feed and conveying means including a re-feed mechanism (ADU mechanism), and a fixing device 17 for fixing toner images.

An image forming unit 10Y for forming yellow (Y) color images has a photosensitive drum 1Y, Y-color charging means 2Y arranged around the photosensitive drum 1Y, exposure means 3Y, developing means 4Y, and cleaning means 8Y for an image forming member. An image forming unit 10M for forming magenta (M) color images has a photosensitive drum 1M, M-color charging means 2M, exposure means 3M, developing means 4M, and cleaning means 8M for an image forming member.

An image forming unit 10C for forming cyan (C) color images has a photosensitive drum 1C, C-color charging means 2C, exposure means 3C, developing means 4C, and cleaning means 8C for an image forming member. An image forming unit 10K for forming black (BK) color images has a photosensitive drum 1K, BK-color charging means 2K, exposure means 3K, developing means 4K, and cleaning means 8K for an image forming member.

The charging means 2Y and the exposure means 3Y, the charging means 2M and the exposure means 3M, the charging means 2C and the exposure means 3C, and the charging means 2K and the exposure means 3K form latent image formation means. Development with the developing means 4Y, 4M, 4C, and 4K is conducted in the form of reverse development with a developing bias generated by superimposing an AC voltage on a DC voltage having the same polarity (a negative polarity in this embodiment) as a polarity of consumed toner. The intermediate transfer belt 6 is rotatably supported with suspended around a plurality of rollers.

The following describes an outline of the image forming process. Regarding an image having various colors formed by the image forming units 10Y, 10M, 10C, and 10K, individual images are sequentially transferred on the rotating intermediate transfer belt 6 by primary transfer rollers 7Y, 7M, 7C, and 7K to which there is applied a primary transfer bias (not shown) having a reverse polarity (a positive polarity in this embodiment) to a polarity of consumed toner (primary transfer), by which composite color image (color image: color toner image) is formed. The color image is transferred from the intermediate transfer belt 6 to paper P.

The paper P in paper cassettes 20A, 20B, and 20C is fed by a feed-out roller 21 and a feeding roller 22A, which are provided for each of the paper cassettes 20A, 20B, and 20C. The paper P is then conveyed to a secondary transfer roller 7A via conveying rollers 22B, 22C, and 22D and a registration roller 23, and the color images are transferred together to one side (surface) of the paper P (secondary transfer).

A fixing device 17 fixes the images transferred to the paper P. The paper P is then held tight by a discharging roller 24 and placed on a discharge tray 25 outside the apparatus. Image forming member cleaning means 8Y, 8M, 8C, and 8K clean transfer residual toner remaining on the peripheral surface of the photosensitive drums 1Y, 1M, 1C, and 1K after the transfer. Thereafter, the color image forming apparatus 200 enters the next image formation cycle.

For a double-sided image formation, an image is formed on one side (surface) of the paper P, the paper P discharged from the fixing device 17 deviates from the sheet discharging path by a branching means 26. It then passes through a lower cyclical path for sheet passing 27A and is reversed by passing through a reverse conveying path 27B, which is a re-feed mechanism (ADU mechanism).

Thereafter, it passes through a re-feed conveying unit 27C and then merges into the sheet discharging path at a feeding roller 22D.

The paper P reversed and conveyed is further conveyed to the secondary transfer roller 7A again via the registration roller 23, where color images (color toner images) are transferred together to the other side (rear surface) of the paper P. The fixing device 17 fixes the color images transferred on the paper P. The paper P is then held tight by the discharging roller 24 and placed on the discharge tray 25 outside the apparatus. On the other hand, the intermediate transfer belt cleaning means 8A removes residual toner on the intermediate transfer belt 6, which separated the paper P by the curvature, after the transfer of the color images to the paper P using the secondary transfer roller 7A.

In the above image formation, it is preferable to use thin paper of 52.3 to 63.9 kg/m$^2$ (1,000 pieces), normal paper of 64.0 to 81.4 kg/m$^2$ (1,000 pieces), thick paper of 83.0 to 130.0 kg/m$^2$ (1,000 pieces), and super thick paper of 150.0 kg/m$^2$ (1,000 pieces) or so as paper P, to set a linear velocity to approximately 80 to 350 mm/sec, and to set a temperature to approximately 5 to 35° C. and a humidity to approximately 15 to 85% as environmental conditions. Regarding a thickness (paper thickness) of paper P, paper of 0.05 to 0.15 mm or so is used.

Figure 7:
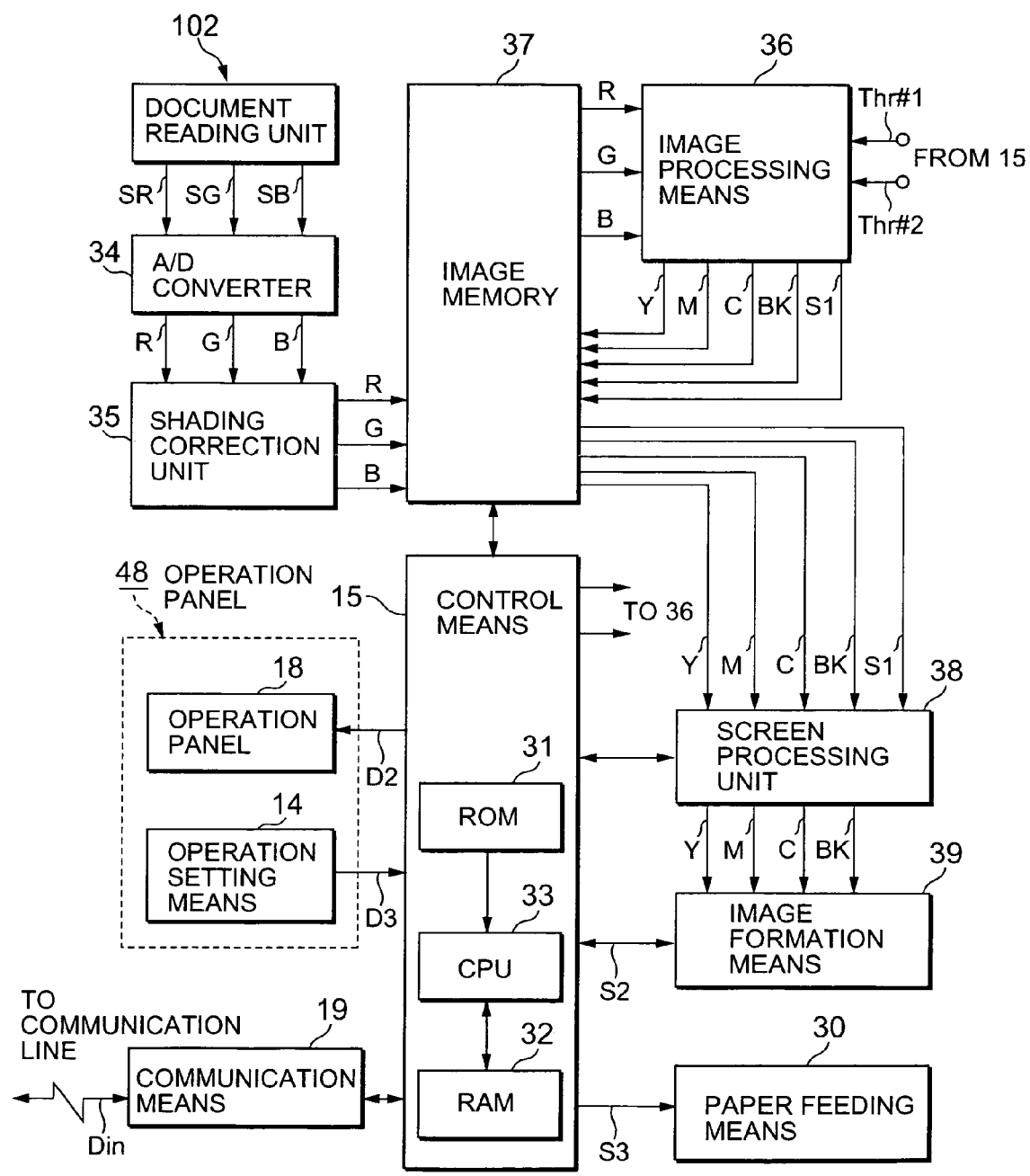
FIG. 7 is a block diagram showing an illustrative internal configuration of a control system of the color image forming apparatus.

Referring to FIG. 7, there is shown a block diagram of an illustrative configuration of a control system of the color image forming apparatus 200. The color image forming apparatus 200 in FIG. 7 forms an image of a document d including a character image, a photographic image, and a screened halftone image of chromatic or achromatic color. The color image forming apparatus 200 has the color scanner feature shown in FIG. 1. The scanner feature comprises a document reading unit 102, an A/D converter 34, a shading correction unit 35, an image memory 37, and an image processing means 36.

The image memory 37 serves as the image memory 13 shown in FIG. 1 and therefore it temporarily stores image data R, G, and B after shading correction or image formation data Y, M, C, and BK after image processing. A DRAM or a hard disc is used for the image memory 37. The parts having the same names or the same reference numerals as for those described in the scanner 100 have the same functions, and therefore their description is omitted here.

The image processing means 36 receives an input of image data R, G, and B of the document d and identifies a character area, a photographic area, and a screened halftone area of the document d on the basis of a first parameter Thr#1. In addition, it determines whether one or more of the character area, the photographic area, and the screened halftone area of the document d are chromatic or achromatic on the basis of a second parameter Thr#2. It then performs image processing according to the chromatic or achromatic character area, photographic area, and screened halftone area of the document d.

Image formation data Y, M, C, and BK obtained as a result of the image processing are temporarily stored in the image memory 37 (electronic RDH function). The image memory 37 is connected to a screen processing unit 38, to which an image identification signal S1 is input. The screen processing unit 38 does not execute screen processing for the character area since screen processing causes an image blur, but executes screen processing for increasing gradations for the photographic and the screened halftone area.

The image processing means 36 is connected to control means 15. The control means 15 controls the image processing means 36 to set a parameter Thr#1 and a parameter Thr#2. The control means 15 is connected to an operation setting means 14 and display means 18. For example, the operation setting means 14 comprises a touch panel and the display means comprises a liquid crystal display-panel. In this embodiment, the liquid crystal display panel as the display means 18 is combined with the touch panel as the operation setting means 14 thereon, thereby achieving a graphic user interface (GUI) operation panel 48.

The control means 15 outputs the parameter Thr#1 and the parameter Thr#2 to the image processing means 36 to control inputs or outputs to or from the image processing means 36. For example, the control means 15 controls it to display a first parameter adjustment content for use in identifying one or more of the character area, the photographic area, and the screened halftone area of the document d and a second parameter adjustment content for use in determining whether one or more of the character area, the photographic area, and the screened halftone area of the document d are chromatic or achromatic on the same screen of the operation panel 48. The operation panel 48 is operated to set the parameter Thr#1 and the parameter Thr#2. For example, the operation panel 48 adjusts an image quality of the document d by setting the parameter Thr#1 and adjusts colored characters of the document d by setting the parameter Thr#2.

The above control means 15 has a read only memory (ROM) 31, a random access memory (RAM) 32, and a central processing unit (CPU) 33. The ROM 31 stores system program data for controlling the entire image forming apparatus. The RAM 32 is used as a work memory: for example, it temporarily stores a control command or the like. Being turned on, the CPU 33 starts the system by reading system program data from the ROM 31 and controls the entire image forming apparatus on the basis of operation data D3 from the operation setting means 14.

The control means 15 is connected to an image formation means 39 comprising the image forming units 10Y, 10M, 10C, and 10K shown in FIG. 6 and operates to form an image on the document on the basis of the contents set by the operation panel 48. For example, the control means 15 outputs an image formation control signal S2 to the image formation means 39 to control inputs or outputs to or from the image formation means 39.

The control means 15 is connected to communication means 19 and paper feeding means 30 besides the image formation means 39. The communication means 19 is connected to a communication line and is for use in communications with an external computer or the like. When the color image forming apparatus 200 is used as a printer, the communication means 19 is used to receive print data $D_{in}$ from the external computer in a print operation mode.

The paper feeding means 30 controls the paper cassettes 20A, 20B, and 20C shown in FIG. 6 on the basis of a paper feed control signal S3 in the print operation mode. For example, the paper feeding means 30 drives the feed-out roller 21 and the feeding roller 22A provided for the paper cassette 20A to let out paper P contained in the paper cassette 20A and to feed it to the image formation means 39. The paper feed control signal S3 is supplied from control means 15 to the paper feeding means 30.

Figure 8:
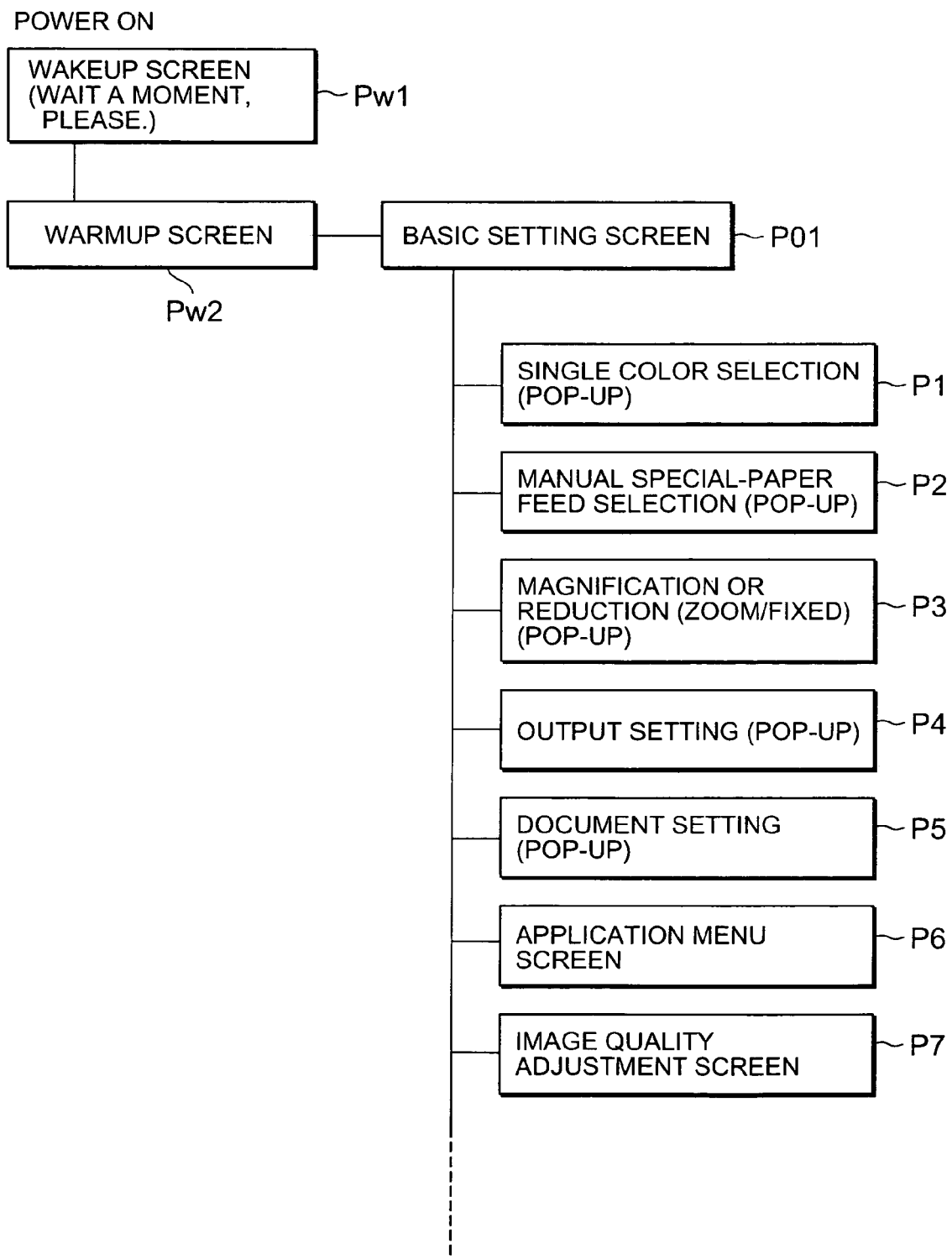
FIG. 8 is a tree structure diagram showing an illustrative screen transition in an operation panel 48.
Figure 9:
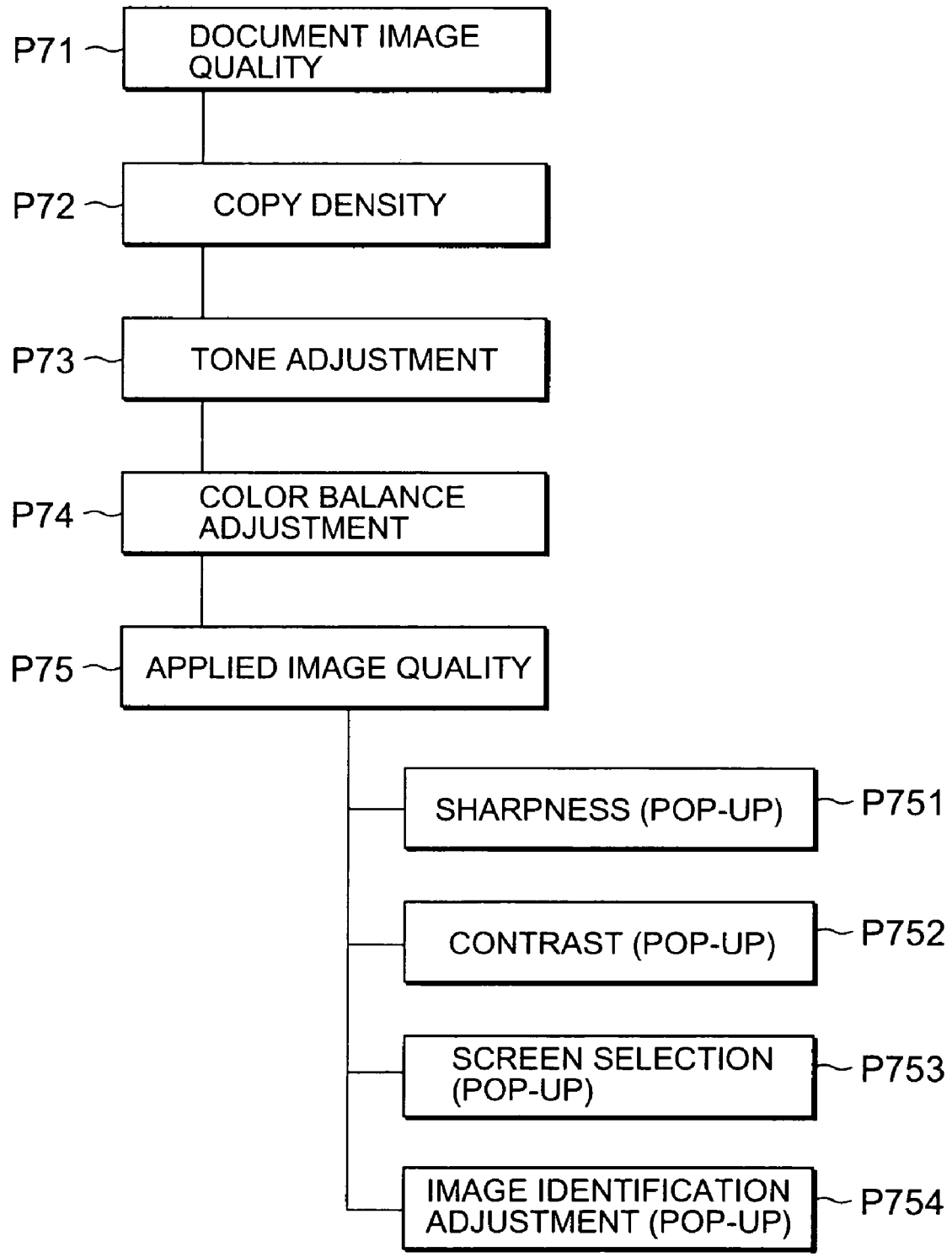
FIG. 9 is a tree structure diagram-showing an illustrative screen transition in a lower class of an image quality adjustment screen P7.

Referring to FIG. 8, there is shown a tree structure diagram of an illustrative screen transition in the operation panel 48. Referring to FIG. 9, there is shown a tree structure diagram of an illustrative screen transition in a lower class of an image quality adjustment screen P7.

According to the illustrative screen transition shown in FIG. 8, the display means 18 of the operation panel 48 shown in FIG. 7 displays a wakeup screen Pw1 as soon as the power is turned on. A message such as "Wait a moment, please" is displayed on the wakeup screen Pw1. In this embodiment, the display means 18 displays a warmup screen Pw2 following the wakeup screen Pw1. After an elapse of warmup time, the display is switched from the warmup screen Pw2 to a basic setting screen P01. In lower classes of the basic setting screen P01, there are provided various screens P1 to P7 for the single color selection, manual special-paper feed selection, magnification or reduction (zoom/fixed), output setting, document setting, application menu, and image quality adjustment.

In this embodiment, in lower classes of the image adjustment screen P7, there are provided icon screens P71 to P75 for the document image quality, copy density, tone adjustment, color balance adjustment, and applied image quality shown in FIG. 9. In lower classes of the icon screen P75 for the applied image quality, there are provided pop-up screens P751 to P754 for the sharpness, contrast, screen selection, and image quality identification adjustment. In this embodiment, the pop-up screen for the image quality identification adjustment (hereinafter, referred to as image identification adjustment screen) P754 can be selected at the setting of image forming conditions.

Figure 10:
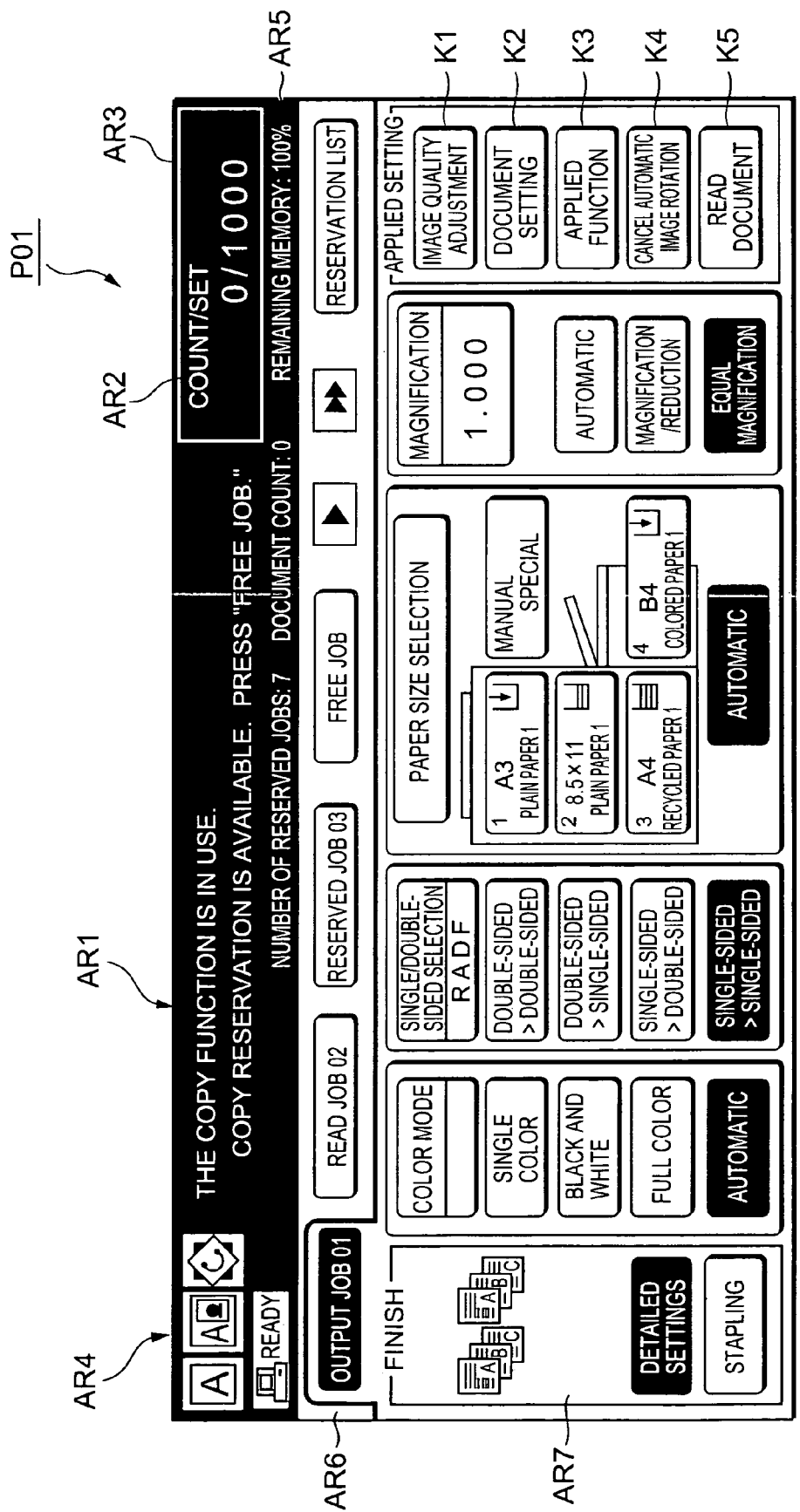
FIG. 10 is an image diagram showing an illustrative display of a basic setting screen P01 on the operation panel 48.

Referring to FIG. 10, there is shown an image diagram of an illustrative display of the basic setting screen P01 on the operation panel 48. The basic setting screen in FIG. 10 is displayed on the operation panel 48 following the wakeup screen Pw1 and the warmup screen Pw2 after the power is turned on. The basic setting screen P01 comprises a message area AR1, a status icon display area AR2, a sheet count display area AR3, a various icon display area AR4, a remaining memory area AR5, a folder button area AR6, and a screen setting display area AR7.

In the message area AR1, a message such as "Copy reservation is available" is displayed. In the screen setting display area AR7, an "application setting" icon is displayed. For the "applied setting" icon, there are provided keys K1 to K5 for "image quality adjustment," "document setting," "applied function," "cancel automatic image rotation," and "read document." A user can select any of the keys K1 to K5 in the "application setting" icon at a copy reservation.

Figure 11:
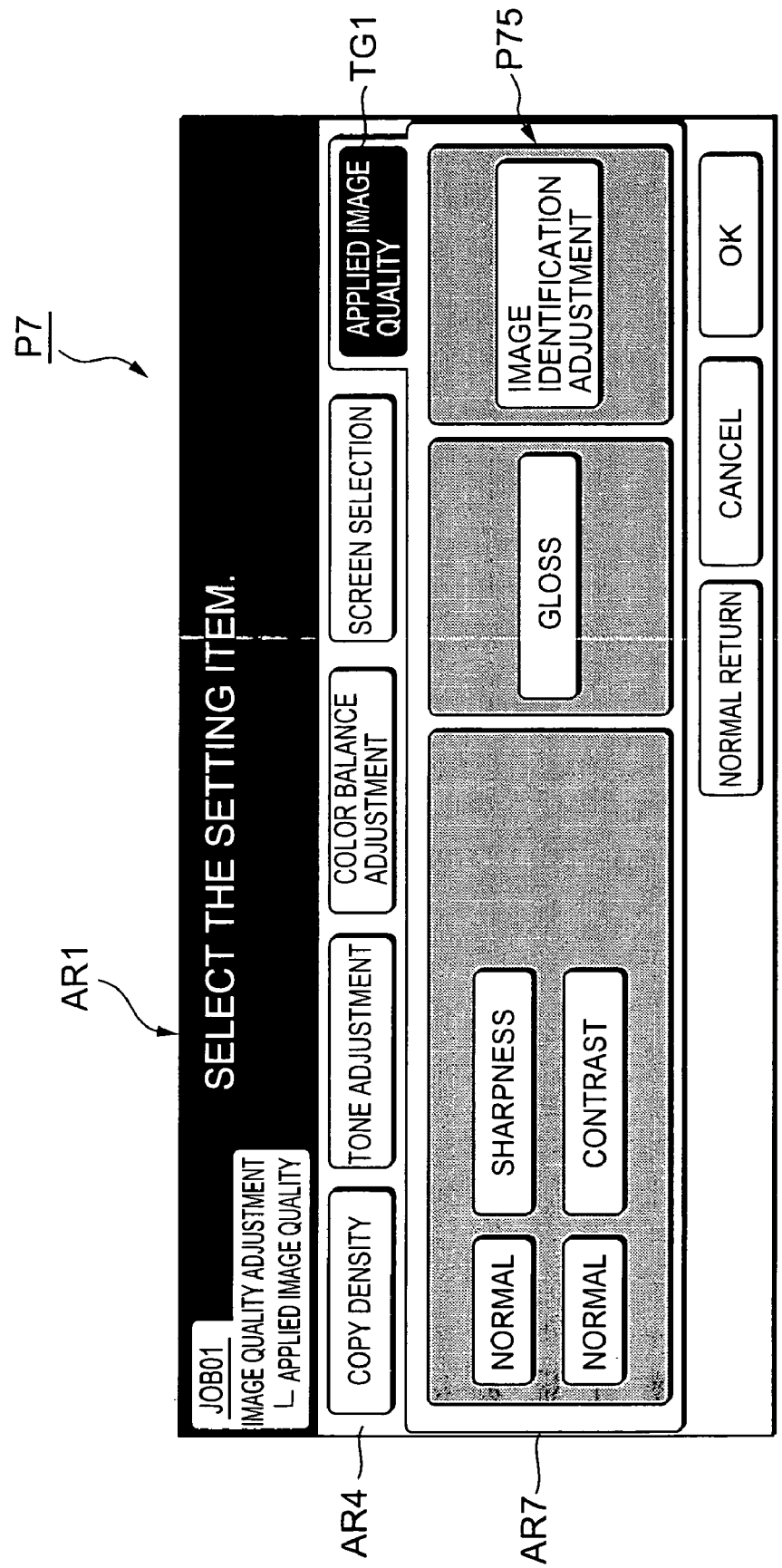
FIG. 11 is an image diagram showing an illustrative display of the image quality adjustment screen P7 on the operation panel 48.

Referring to FIG. 11, there is shown an image diagram of an illustrative display of the image quality adjustment screen P7 on the operation panel 48. The image quality adjustment screen P7 in FIG. 11 is displayed on the operation panel 48 when the "image quality adjustment" key K1 is depressed being selected in the "application setting" icon on the basic setting screen P01 shown in FIG. 10. A message such as "Select the setting item" is displayed on the image quality adjustment screen P7. For example, in the various-icon display area AR4, an "applied image quality" tag TG1 is displayed with "image quality adjustment." If the "applied image quality" tag TG1 is selected, the icon screen for the applied image quality P75 is displayed under the message area AR1 and the various icon display area AR4.

On the icon screen P75, there are displayed setting items of "sharpness," "contrast," "gloss," "screen selection," and "image identification adjustment." Regarding "sharpness" and "contrast," a term indicating an amount of adjustment such as "normal" is displayed. The "image identification adjustment" setting item is provided to set the parameters Thr#1 and the Thr#2 for the image identification processing unit 62 shown in FIG. 2. The user can select the "image-identification adjustment" setting item at the copy reservation.

Figure 12:
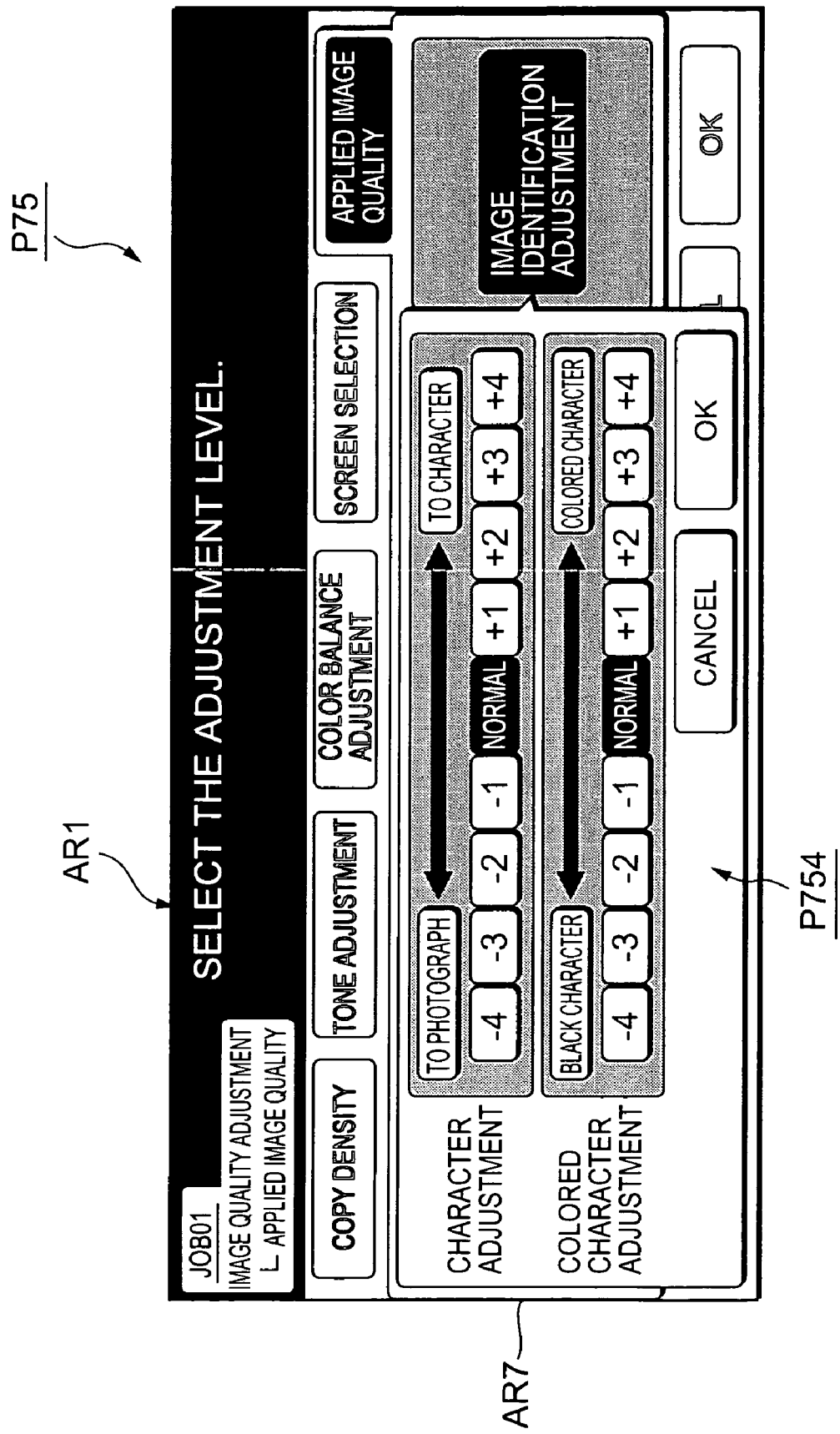
FIG. 12 is an image diagram showing an illustrative display of an image identification adjustment screen P754 on the operation panel 48.

Referring to FIG. 12, there is shown an image diagram of an illustrative display of the image identification adjustment screen P754 on the operation panel 48. The image identification adjustment screen P754 in FIG. 12 is displayed on the operation panel 48 when the "image identification adjustment" setting item is selected from the "applied image quality" tag TG1 on the icon screen P75 shown in FIG. 11. A message such as "Select the adjustment level" is displayed on the icon screen P75. In the screen setting display area AR7 of the image identification adjustment screen P754, "colored character adjustment" is displayed with "character adjustment." The display is made to set the parameters (thresholds) Thr#1 and Thr#2 for image identification.

The "character adjustment" setting item is an example of the parameter adjustment content and is displayed on the operation panel 48 with the "colored character adjustment" setting item as an example of the second parameter adjustment convent on the same screen (image identification adjustment screen) of the operation panel 48. In the "character adjustment" setting item of the image identification adjustment screen P754, a two-sided arrow is displayed between a term "to photograph" in the leftmost part and a term "to character" in the rightmost part.

Under the center of the two-sided arrow, a "normal" push button is displayed for an amount of adjustment. Furthermore, push buttons "+1," "+2," "+3," and "+4" are displayed toward the extreme right starting from the center, while push buttons "−1," "−2," "−3," and "−4" are displayed toward the extreme left starting from the center. For example, regarding "character adjustment," the user selects some "+" button to increase a rate of the character identification and selects some "−" button to increase a rate of the photographic identification by controlling the push buttons.

Furthermore, in the "colored character adjustment" setting item of the image identification adjustment screen P754, a two-sided arrow is displayed between a term "black character" in the leftmost part and a term "colored character" in the rightmost part. Under the center of the two-sided arrow, a "normal" push button is displayed for an amount of adjustment. Furthermore, push buttons "+1," "+2," "+3," and "+4" are displayed toward the extreme right starting from the center, while push buttons "−1," "−2," "−3," and "−4" are displayed toward the extreme left starting from the center. For example, regarding "colored character adjustment," the user selects some "+" button to increase a rate of the colored character identification and selects some "−" button to increase a rate of the black character identification by controlling the push buttons.

The amount of adjustment input from the operation panel 48 in this embodiment is output to the CPU 33 as operation data D3 as shown in FIG. 7. The CPU 33 converts the operation data D3, involved in the amount of adjustment input from the operation panel 48 to the parameters Thr#1 and Thr#2 for the image identification and outputs these parameters Thr#1 and Thr#2 to the image identification processing unit 62. The parameter Thr#1 is for use in switching an image identification level of the image area identification unit 63 and the parameter Thr#2 is for use in switching a color identification level of the chromatic color identification unit 64.

Figure 13:
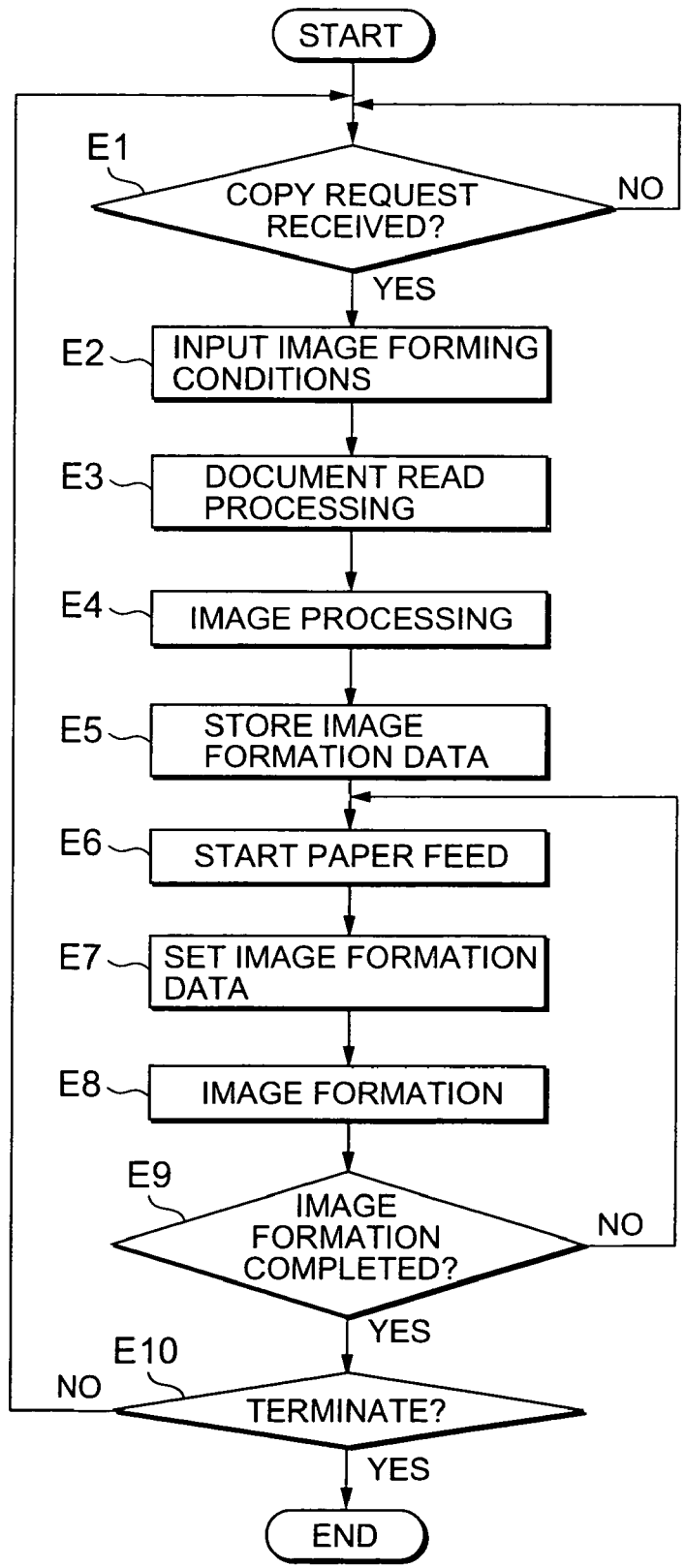
FIG. 13 is a flowchart showing an illustrative operation of the color image forming apparatus 200.

The following describes an image processing method for the color image forming apparatus 200. Referring to FIG. 13, there is shown a flowchart of an illustrative operation of the color image forming apparatus 200.

This embodiment is based on the assumption that the image identification adjustment screen P754 as shown in FIG. 12 is displayed on the operation panel 48 and that the parameters Thr#1 and Thr#2 are set for the image identification processing unit 62 on the image identification adjustment screen P754 when a color image is formed by reading image information on a document d including a character image, a photographic image, and a screened halftone image of chromatic or achromatic color.

With these operating conditions, the CPU 33 shown in FIG. 7 awaits a copy request in step E1 of the flowchart shown in FIG. 11. Upon receiving the copy request, the control progresses to step E2. In step E2, the CPU 33 inputs image forming conditions from the operation panel 48. In this condition, the user depresses the key K1 in the "application setting" icon on the basic setting screen P01 shown in FIG. 10. The depression of the key K1 switches the display from the basic setting screen P01 to the image quality adjustment screen P7 shown in FIG. 11.

Furthermore, the user selects the icon screen P75 for the applied image quality in the image quality adjustment screen P7. With the selection of the icon screen P75, the image identification adjustment screen P754 shown in FIG. 12 pops up on the icon screen P75 and is displayed on the operation panel 48.

In this condition, for example, regarding "character adjustment," the user selects some "+" button to increase a rate of the character identification and selects some "−" button to increase a rate of the photographic identification by controlling the push buttons. Furthermore, regarding "colored character adjustment," the user selects some "+" button to increase a rate of the colored character identification and selects some "−" button to increase a rate of the black character identification by controlling the push buttons.

The amount of adjustment input from the operation panel 48 as stated above is output to the CPU 33 as operation data D3 as shown in FIG. 7. The CPU 33 converts the operation data D3 involved in the amount of adjustment input from the operation panel 48 to the parameters Thr#1 and Thr#2 for the image identification and outputs these parameters Thr#1 and Thr#2 to the image identification processing unit 62.

Upon a completion of the setting processing for the image forming conditions, the control progresses to step E3 to execute document read processing in the document reading unit 102. In the execution, the document reading unit 102 reads image information from the document d and outputs analog image signals SR, SG, and SB to the A/D converter 34. The A/D converter 34 performs A/D conversion for the analog image signals SR, SG, and SB, thereby converting them to image data R, G, and B for digital R, G, and B colors. The image data R, G, and B are compressed and encoded after shading correction and are stored in the image memory 37.

Thereafter, the control progresses to step 4, where the image processing means 36 reads the image data R, G, and B from the image memory 37 to execute image processing. For example, the image processing means 36 decompresses and decodes the image data R, G, and B read from the image memory 37 and then identifies one or more of the character area, the photographic area, and the screened halftone area of the document d on the basis of a first identification reference value Thr#1. In addition, the image processing means 36 determines whether one or more of the character area, the photographic area, and the screened halftone area of the document d is chromatic or achromatic on the basis of a second identification reference value Thr#2. The identification processing is for executing image processing according to the character image, the photographic image or the screened halftone image of chromatic or achromatic color of the document d.

The image processing means 36, for example, expands the image data R, G, and B and performs edge enhancement for the character area of the document d based on the parameter adjustment value, smoothing processing for the photographic area thereof, and moire removal for the screened halftone area thereof. The gamma control unit 65 shown in FIG. 2 increases the contrast for the character area of the document d and increases the gradations for the photographic and screened halftone areas on the basis of the parameter adjustment values.

Furthermore, the color conversion unit 66 converts the image data R, G, and B to printer color materials, Y, M, and C signals for the chromatic areas of the document d. It converts the image data R, G, and B to achromatic BK signals for the achromatic areas of the document d. Upon receiving inputs of the color-converted image formation data Y, M, C, and BK, the error diffusion unit 67 performs lower-bit error diffusion processing for the character area of the document d and higher-bit error diffusion processing for the photographic and screened halftone areas of the document d.

The image formation data Y, M, C, and BK after the image processing are data color-adjusted based on the image forming conditions previously set on the operation panel 48, and they are stored once into the image memory 37 from the image processing means 36 in step E5 (electronic RDH). Then, the control progresses to step E6, where the CPU 33 starts paper feed processing. In this condition, the paper feeding means 30 shown in FIG. 7 lets out paper P based on the setting of the image forming conditions from the paper cassette 20A or the like on the basis of the paper feed control signal S3, by which the paper P is conveyed to the image formation means 39.

Thereafter, the control progresses to step E7, where the CPU 33 reads the image formation data Y, M, C, and BK from the image memory 37, screens the image formation data Y, M, C, and BK, and sets them to the image forming units 10Y, 10M, 10C, and 10K. The image formation data set to the image forming units 10Y, 10M, 10C, and 10K are color-adjusted data.

Thereafter, the control progresses to step E8, where the image forming units 10Y, 10M, 10C, and 10K form an image on the basis of the image formation data Y, M, C, and BK. In the image formation, the image formation data Y goes through pulse width modulation (PWM) in the image forming unit 10Y and a Y-color laser drive signal after the PWM modulation is supplied to exposure means 3Y. In the same manner, the image formation data M, C, and BK are PWM-modulated in the image forming units 10M to 10K in the same manner and M-, C-, and BK-color laser drive signals after the PWM modulation are supplied to exposure means 3C to 3K, respectively.

The exposure means 3Y scans a laser beam based on the Y-color laser drive signal for the photosensitive drum 1Y charged at a given potential. A Y-color electrostatic latent image is formed on the photosensitive drum 1Y. The developing means 4Y develops the electrostatic latent image on the photosensitive drum 1Y using toner. This development causes a Y-color toner image to be formed on the photosensitive drum 1Y. Other exposure means 3C to 3K perform the same processing, thereby causing M-, C-, and BK-color toner images to be formed on the photosensitive drums 1M, 1C, and 1K, respectively.

The images of various colors formed by the image forming units 10Y, 10M, 10C, and 10K are sequentially transferred to the rotating intermediate transfer belt 6 by the primary transfer rollers 7Y, 7M, 7C, and 7K to which there is applied a primary transfer bias having a reverse polarity to that of the consumed toner, by which a composite color image is formed. The color image is transferred from the intermediate transfer belt 6 to paper P.

The paper P with the color image transferred goes through a fixing process by the fixing device 17. It is then held tight by the discharging roller 24 and placed on the discharge tray 25 outside the apparatus. Transfer residual toner on peripheral surfaces of the photosensitive drums 1Y, 1M, 1C, and 1K after the transfer is cleaned by the image forming members, cleaning means 8Y, 8M, 8C, and 8K. Then, the apparatus enters the next image formation cycle.

In step E9, the CPU 33 determines whether the image formation is completed by the preset number of sets. If not so, the control returns to step E6 to let out paper P from the paper cassette 20A. Then, in step E7, the image formation data Y, M, C, and BK are set to the image forming units 10Y, 10M, 10C, and 10K. Thereafter, in step E8, images based on the image formation data Y, M, C, and BK are formed on the paper P.

If the image formation is completed by the preset number of sets in step E9, the control progresses to step E10 to check whether to terminate the copy processing. Unless the copy process is terminated, the apparatus detects power save information and then the control returns to step E1 to await a copy request. If the copy processing is terminated, the apparatus detects power-off information and terminates the control processing.

Therefore, according to the color image forming apparatus and the image processing method therefor as the embodiments of the present invention, a scanner function according to the present invention is applied to an image formation of a document d including a character image, a photographic image, and a screened halftone image of chromatic or achromatic color, where the CPU 33 controls the operation panel 48 to display the content of "character adjustment" for identifying one or more of the character area, the photographic area, and the screened halftone area of the document d and the content of "colored character adjustment" for determining whether one or more of the character area, the photographic area, and the screened halftone area of the document d are chromatic or achromatic on the same screen of the image quality identification adjustment screen P754, which is a lower class of the image quality adjustment screen P7.

Therefore, the operator can set the content of "colored character adjustment" while visually checking the content of "character adjustment" on the same screen. For example, if a thick character of the document d is identified as a photographic area and smoothing processing blurs character edges and decreases the contrast, the level can be adjusted to the side of "to character" of the "character adjustment" setting item shown in FIG. 12. This operation changes the parameter Thr#1 to control the image identified as a photographic area on the basis of the image data R, G, and B to be closer to the character area. Thereby, the thick character is identified as a character area, instead of being identified as a photographic area. Therefore, the output results in a character having sharp character edges and higher contrast.

Furthermore, according to a quality of the document d, a gray character with a tinge of some color may be determined to be a chromatic character and output with the color materials (chromatic color) of the image formation data Y, M, and C, thereby deteriorating the character quality or increasing a consumption of toner. If so, the level can be adjusted to the side of "black character" of the "colored character adjustment" setting item in FIG. 12 to increase the achromatic area for the image data R, G, and B, by which a gray character with a ting of some color is output in solid black. Thereby, the character quality increases and the consumption of toner can be reduced.

Moreover, according to the method of the present invention, an operator can handle both parameters Thr#1 and Thr#2 on the same screen of the image quality identification adjustment screen P754 and can adjust colors easily and quickly since he or she can check the adjustment amounts of the parameters at a time. In addition, push buttons to be controlled are clearly displayed on the image quality identification adjustment screen P754. Therefore, the user can easily understand where the push buttons of "character adjustment," "colored character adjustment," and the like are displayed.

As set forth hereinabove, according to the present invention, there is provided a document reader, comprising control means for displaying a first identification reference value adjustment content for use in identifying one or more of a character area, a photographic area, and a screened halftone area of a document and a second identification reference value adjustment content for use in determining whether one or more of the character area, the photographic area, and the screened halftone area of the document are chromatic or achromatic on the same screen when processing an image by reading the document including one of a character image, a photographic image, and a screened halftone image of chromatic or achromatic color.

With the feature, an operator can set the second identification reference value adjustment content while visually checking the first identification reference value adjustment content on the same screen. Therefore, operationality is improved in color adjustment of an image quality, colored characters, or the like of the document. Furthermore, it prevents a character area from being incorrectly identified as a photographic area and prevents incorrect image processing such as blurring an edge of a thick character. In addition, it prevents an achromatic character from being incorrectly identified as a chromatic character and prevents incorrect image processing such as coloring a black character.

According to the present invention, there is provided an image forming apparatus, comprising control means for displaying a first identification reference value adjustment content for use in identifying one or more of a character area, a photographic area, and a screened halftone area of a document and a second identification reference value adjustment content for use in determining whether one or more of the character area, the photographic area, and the screened halftone area of the document are chromatic or achromatic on the same screen when forming an image including one of a character image, a photographic image, and a screened halftone image of chromatic or achromatic color.

With the feature, an operator can set the second identification reference value adjustment content while visually checking the first identification reference value adjustment content on the same screen. Therefore, operationality is improved in color adjustment of an image quality, colored characters, or the like of the document. Furthermore, it prevents a character area from being incorrectly identified as a photographic area and prevents incorrect image processing such as blurring an edge of a thick character. In addition, it prevents an achromatic character from being incorrectly identified as a chromatic character and prevents incorrect image processing such as coloring a black character.

According to the present invention, there is provided an image processing method, comprising displaying a first identification reference value adjustment content for use in identifying one or more of a character area, a photographic area, and a screened halftone area of a document and a second identification reference value adjustment content for use in determining whether one or more of the character area, the photographic area, and the screened halftone area of the document are chromatic or achromatic on the same screen when processing image information on the document including one of a character image, a photographic image, and a screened halftone image of chromatic or achromatic color.

With the feature, an operator can set the second identification reference value adjustment content while visually checking the first identification reference value adjustment content on the same screen. Therefore, operationality is improved in color adjustment of an image quality, colored characters, or the like of the document. Furthermore, it prevents a character area from being incorrectly identified as a photographic area and prevents incorrect image processing such as blurring an edge of a thick character. In addition, it prevents an achromatic character from being incorrectly identified as a chromatic character and prevents incorrect image processing such as coloring a black character.

The present invention is greatly preferred when it is applied to a scanner, a color digital copying machine, or a complex machine having an image area identification and adjustment function of identifying an image area and adjusting image information.

What is claimed is:

1. An image reading apparatus comprising:
   an image reading section which reads an image of a document to obtain image information;
   a first identification section to which the image information obtained from the image reading section is input, and which determines whether the image information is image information of a character area or other areas based on a first identification reference value;
   a second identification section which determines whether the image information determined as the character area is chromatic or achromatic based on a second identification reference value;
   an operation section for inputting and adjusting the first identification reference value and the second identification reference value; and
   a display control section which receives a first adjustment content of the first identification reference value and a second adjustment content of the second identification reference value from the operation section and which displays the first adjustment content and the second adjustment content on a same screen of a display.

2. The image reading apparatus as claimed in claim 1, wherein said other areas comprise at least one of a photographic area and a screened halftone area.

3. The image reading apparatus as claimed in claim 1, further comprising an image processing section for processing the image information based on a result of identification by the first identification section and a result of identification by the second identification section.

4. An image forming apparatus comprising:
   an image forming section which forms an image on a sheet based on input image information;

a first identification section which determines whether the image information is image information of a character area or other areas based on a first identification reference value;

a second identification section which determines whether the image information determined as the character area is chromatic or achromatic based on a second identification reference value;

an operation section for inputting and adjusting the first identification reference value and the second identification reference value; and a display control section which receives a first adjustment content of the first identification reference value and a second adjustment content of the second identification reference value from the operation section and which displays the first adjustment content and the second adjustment content on a same screen of a display.

5. The image forming apparatus as claimed in claim 4, further comprising an image reading section which reads an image of a document to input the image information.

6. The image forming apparatus as claimed in claim 4, wherein said other areas comprise at least one of a photographic area and a screened halftone area.

7. The image forming apparatus as claimed in claim 4, further comprising an image processing section for processing the image information based on a result of identification by the first identification section and a identification by the second identification section, wherein the image forming section forms the image on the sheet based on image information processed by the image processing section.

* * * * *